US00RE46098E

(19) United States
(12) Reissued Patent
Bickham et al.

(10) Patent Number: US RE46,098 E
(45) Date of Reissued Patent: Aug. 9, 2016

(54) OPTICAL FIBER ILLUMINATION SYSTEMS AND METHODS

(71) Applicant: Corning Incorporated, Corning, NY (US)

(72) Inventors: Scott Robertson Bickham, Corning, NY (US); Dana Craig Bookbinder, Corning, NY (US); Edward John Fewkes, Horseheads, NY (US); Stephan Lvovich Logunov, Corning, NY (US)

(73) Assignee: Corning Incorporated, Corning, NY (US)

(21) Appl. No.: 14/689,756

(22) Filed: Apr. 17, 2015

Related U.S. Patent Documents

Reissue of:
(64) Patent No.: 8,545,076
Issued: Oct. 1, 2013
Appl. No.: 13/213,363
Filed: Aug. 19, 2011

U.S. Applications:
(63) Continuation of application No. 12/950,045, filed on Nov. 19, 2010, now Pat. No. 8,591,087.

(60) Provisional application No. 61/263,023, filed on Nov. 20, 2009.

(51) Int. Cl.
*G02B 6/028* (2006.01)
*G05D 25/00* (2006.01)
(Continued)

(52) U.S. Cl.
CPC ..... *G02B 6/001* (2013.01); *C03C 13/045* (2013.01); *C03C 25/102* (2013.01);
(Continued)

(58) Field of Classification Search
CPC .. G02B 6/001; G02B 6/0029; G02B 6/02314; G02B 6/02319
See application file for complete search history.

(56) References Cited

U.S. PATENT DOCUMENTS 3,884,550 A * 5/1975 Maurer et al. ..... 385/142
4,138,194 A * 2/1979 Beasley et al. ..... 385/143
(Continued)

FOREIGN PATENT DOCUMENTS

CN 101536604 A 9/2009
EP 0895104 A1 3/1999
(Continued)

OTHER PUBLICATIONS

International Search Report for International Patent Application No. PCT/US2010/057395 (Mar. 31, 2011).
(Continued)

*Primary Examiner* — James Menefee
(74) *Attorney, Agent, or Firm* — LeClairRyan, a Professional Corporation

(57) ABSTRACT

An illumination system generating light having at least one wavelength within 200 nm a plurality of nano-sized structures (e.g., voids). The optical fiber coupled to the light source. The light diffusing optical fiber has a core and a cladding. The plurality of nano-sized structures is situated either within said core or at a core-cladding boundary. The optical fiber also includes an outer surface. The optical fiber is configured to scatter guided light via the nano-sized structures away from the core and through the outer surface, to form a light-source fiber portion having a length that emits substantially uniform radiation over its length, said fiber having a scattering-induced attenuation greater than 50 dB/km for the wavelength(s) within 200 nm to 2000 nm range.

121 Claims, 7 Drawing Sheets

(51) Int. Cl.

| | |
|---|---|
| ***F21V 8/00*** | (2006.01) |
| ***G02B 6/02*** | (2006.01) |
| ***C03C 25/10*** | (2006.01) |
| ***C03C 13/04*** | (2006.01) |

(52) U.S. Cl.
CPC ..... *C03C 25/1045* (2013.01); *G02B 6/0003* (2013.01); *G02B 6/0229* (2013.01); *G02B 6/02347* (2013.01); *G02B 6/02361* (2013.01); *G02B 6/02366* (2013.01)

(56) References Cited

U.S. PATENT DOCUMENTS

| | | | | |
|---|---|---|---|---|
| 4,195,907 | A | 4/1980 | Zamja et al. | |
| 4,422,719 | A | 12/1983 | Orcutt | 350/96.3 |
| 4,466,697 | A * | 8/1984 | Daniel | 385/123 |
| 4,626,068 | A * | 12/1986 | Caldwell | 385/128 |
| 5,027,259 | A * | 6/1991 | Chujko | 362/582 |
| 5,067,831 | A | 11/1991 | Robbins et al. | |
| 5,117,472 | A * | 5/1992 | Blyler et al. | 385/28 |
| 5,579,429 | A * | 11/1996 | Naum | 385/143 |
| 5,881,200 | A * | 3/1999 | Burt | 385/142 |
| 5,937,127 | A * | 8/1999 | Zarian et al. | 385/128 |
| 5,967,638 | A * | 10/1999 | Gorman et al. | 362/84 |
| 5,982,969 | A | 11/1999 | Sugiyama et al. | |
| 6,154,595 | A | 11/2000 | Yokogawa et al. | |
| 6,169,836 | B1 | 1/2001 | Sugiyama et al. | 385/123 |
| 6,385,855 | B1 * | 5/2002 | Tymianski | 33/265 |
| 6,519,401 | B1 | 2/2003 | Imamura et al. | |
| 6,563,993 | B1 | 5/2003 | Imamura et al. | |
| 6,563,995 | B2 * | 5/2003 | Keaton et al. | 385/127 |
| 6,714,711 | B1 | 3/2004 | Lieberman et al. | |
| 6,766,091 | B2 | 7/2004 | Beuth et al. | |
| 6,830,366 | B2 | 12/2004 | Irie | |
| 6,895,154 | B2 * | 5/2005 | Johnson et al. | 385/125 |
| 7,020,378 | B2 | 3/2006 | Poisel et al. | |
| 7,031,590 | B2 * | 4/2006 | Gasca et al. | 385/142 |
| 7,054,513 | B2 | 5/2006 | Herz et al. | |
| 7,142,758 | B1 * | 11/2006 | Herz et al. | 385/125 |
| 7,194,184 | B2 * | 3/2007 | Buelow et al. | 385/142 |
| 7,289,709 | B2 * | 10/2007 | Folkenberg et al. | 385/126 |
| 7,433,565 | B2 | 10/2008 | Joseph et al. | |
| 7,450,806 | B2 | 11/2008 | Bookbinder et al. | |
| 7,526,166 | B2 * | 4/2009 | Bookbinder et al. | 385/125 |
| 7,549,782 | B2 * | 6/2009 | Ng et al. | 362/555 |
| 7,628,548 | B2 * | 12/2009 | Benjamin | G02B 6/382 385/125 |
| 7,677,059 | B2 * | 3/2010 | Mori et al. | 65/393 |
| 7,708,476 | B2 * | 5/2010 | Liu | G02B 6/02314 385/125 |
| 7,742,670 | B2 * | 6/2010 | Benjamin | G02B 6/3806 385/125 |
| 7,930,904 | B2 | 4/2011 | Bookbinder et al. | |
| 8,035,891 | B2 * | 10/2011 | Goto | 359/341.1 |
| 8,218,938 | B2 | 7/2012 | Ho | |
| 8,333,494 | B2 | 12/2012 | Kanade et al. | |
| 8,582,943 | B2 * | 11/2013 | Alkemper | C03B 37/01211 385/124 |
| 2004/0013376 | A1 * | 1/2004 | Mikolas | 385/123 |
| 2004/0196648 | A1 | 10/2004 | Franklin et al. | |
| 2006/0120678 | A1 | 6/2006 | Manyam et al. | |
| 2008/0158905 | A1 | 7/2008 | Chuang et al. | 362/581 |
| 2010/0053970 | A1 | 3/2010 | Sato et al. | |
| 2010/0142226 | A1 * | 6/2010 | Vogt | B60Q 3/004 362/625 |

FOREIGN PATENT DOCUMENTS

| | | | |
|---|---|---|---|
| JP | 57-028409 | A | 2/1982 |
| JP | 58-208708 | A | 12/1983 |
| JP | 04-317432 | A | 11/1992 |
| JP | 6-118239 | | 4/1994 |
| JP | 6-118239 | A | 4/1994 |
| JP | 0922517 | | 8/1996 |
| JP | 0922517 | | 8/1997 |
| JP | 10-274713 | A | 10/1998 |
| JP | 2000047038 | A | 2/2000 |
| JP | 2004342405 | A | 12/2004 |
| JP | 2008-26814 | | 2/2008 |
| JP | 2008-26814 | A | 2/2008 |
| KR | 2002-0066493 | | 8/2002 |
| KR | 2002-0066493 | A | 8/2002 |
| LV | 11644 | B | 4/1997 |
| WO | 02/095289 | | 11/2002 |
| WO | 02/095289 | A1 | 11/2002 |
| WO | 2008/024397 | A2 | 2/2008 |
| WO | 2009/100834 | A1 | 8/2009 |
| WO | 2010/011299 | | 1/2010 |
| WO | 2010011299 | A2 | 1/2010 |

OTHER PUBLICATIONS

Written Opinion of the International Search Authority, filed in International Patent Application No. PCT/US2010/057395 (Apr. 2007).
International Preliminary Report on Patentability filed in International Patent Application No. PCT/US2010/057395 (May 11, 2012).
D.S.G. Thomas et al., "Atmospheric Composition", The Dictionary of Physical Geography, 2000, Blackwell Publishers Ltd., 2 pages.
Informal Communication by Telephone with the Applicant filed in International Patent Application No. PCT/US2010/057395 (Apr. 17, 2012).
Office Action for Japanese Patent Application No. 2012-540082, Drafting date Jun. 30, 2015, pp. 1-7.
European Patent Office, Notice of Opposition, European Patent Application No. 2502101, Sep. 14, 2015, German version.
European Patent Office, Notice of Opposition, European Patent Application No. 2502101, Sep. 14, 2015, English translation.
European Patent Office, Summons to attend oral proceedings pursuant to Rule 115(1) EPC, European Patent Application No. 10781797.5-1562/2502101, Feb. 13, 2014.
Office Action for Chinese Patent Application No. 201080052456.2, Date of Dispatch: Jun. 2, 2015.
Office Action for Chinese Patent Application No. 201080052456.2, Date of Dispatch: Feb. 24, 2014.
Office Action for Chinese Patent Application No. 201080052456.2, Date of Dispatch: Dec. 1, 2014.
Schott, Lighting and Imaging, www.schott.com/lightingimaging.
Office Action for Japanese Patent Application No. 2012-540082, Drafting date Jul. 17, 2014, pp. 1-4.

* cited by examiner

OPTICAL FIBER ILLUMINATION SYSTEMS AND METHODS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is a continuation of U.S. patent application Ser. No. 12/950,045 filed on Nov. 19, 2010 entitled "Optical Fiber Illumination Systems and Methods" claims the benefit of priority under 35 USC 119(e) of U.S. Provisional Application Ser. No. 61/263,023 filed Nov. 20, 2009.

BACKGROUND

1. Field

The present invention relates generally to light diffusing optical fibers having a region with nano-sized structures, and in particular to illumination systems and methods that employ such fibers for different applications including bioreactors, signage and special lighting applications.

2. Technical Background

Optical fibers are used for a variety of applications where light needs to be delivered from a light source to a remote location. Optical telecommunication systems, for example, rely on a network of optical fibers to transmit light from a service provider to system end-users.

Telecommunication optical fibers are designed to operate at near-infrared wavelengths in the range from 800 nm to 1675 nm where there are only relatively low levels of attenuation due to absorption and scattering. This allows most of the light injected into one end of the fiber to exit the opposite end of the fiber with only insubstantial amounts exiting peripherally through the sides of the fiber.

Recently, there has been a growing need to have optical fibers that are less sensitive to bending than conventional fibers. This is because more and more telecommunication systems are being deployed in configurations that require the optical fiber to be bent tightly. This need has lead to the development of optical fibers that utilize a ring of small non-periodically disposed voids that surround the core region. The void containing ring serves to increase the bend insensitivity—that is to say, the fiber can have a smaller bend radius without suffering a significant change in the attenuation of the optical signal passing through. In these fibers the void containing ring region is placed in the cladding of the optical fiber some distance from the core in order to minimize amount of the light propagation through void containing ring region, since it could increase optical loss.

Because optical fibers are typically designed to efficiently deliver light from one end of the fiber to the other end of the fiber over long distances, very little light escapes from the sides of the typical fiber, and, therefore optical fibers are not considered to be well-suited for use in forming an extended illumination source. Yet, there are a number of applications such as special lighting, signage, or biological applications, including bacteria growth and the production of photo-bioenergy and biomass fuels, where select amounts of light need to be provided in an efficient manner to the specified areas. For biomass growth there is a need to develop processes that convert light energy into biomass-based fuels. For special lighting the light source needs to be thin, flexible, and easily modified to variety of different shapes.

SUMMARY OF THE INVENTION

According to some embodiments, first aspect of the invention is an illumination system that generates light having at least one wavelength ($\lambda$) within the 200 nm to 2000 nm range. The system includes a light source and at least one light diffusing optical fiber. The light diffusing optical fiber has a core and a cladding. A plurality of nano-sized structures is situated either within said core or at a core-cladding boundary. The optical fiber also includes an outer surface, and an end optically coupled to the light source. The optical fiber is configured to scatter guided light via said nano-sized structures away from the core and through the outer surface, to form a light-source fiber portion having a length that emits substantially uniform radiation over its length, said fiber having a scattering-induced attenuation of greater than 50 dB/km for said wavelength. According to some embodiments the light source coupled to the fiber generates light in 200 nm to 500 nm wavelength range and fluorescent material in the fiber coating generates either white, green, red, or NIR (near infrared) light.

According to some embodiments, the illumination system includes a single light diffusing fiber. According to other embodiments the illumination system includes a plurality of light diffusing fibers. These light diffusing fibers may be utilized in a straight configuration, or may be bent.

According to some exemplary embodiments the illumination system may be used for a biological growth system, and may further include a biological chamber with an interior configured to contain biological material. In these embodiments a light source generates light having a wavelength to which the biological material is sensitive. The fiber may have a plurality of bends formed therein so as to scatter guided light away from the central axis, out of the core, and through the outer surface to form a light-source fiber portion having a length that emits substantially uniform radiation over its length.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Thus, one advantageous feature of at least some embodiments of the present invention is that the illumination systems and methods that utilise the optical fibers' ability to efficiently deliver light to remote locations and that such fibers will scatter light relatively uniformly even when deployed in different shapes (e.g., bent, coiled or straight) to match the needs of application. In addition, one advantageous feature of some embodiments of the present invention is that the light diffusing fibers according to at least some of the exemplary embodiments of the present invention are capable of providing illumination with a weak wavelength dependence, wherein the scattering loss $L_S$ within the 200 nm to 2000 nm wavelength range is proportional to $\lambda^{-p}$, where p is greater or equal to 0 and less than 2, preferably less than 1, and more preferably less than 0.5 or even more preferably less than 0.3. Another advantageous feature of at least some embodiments of the present invention is the capability of having substantially uniform scattering along the length (e.g., less than 50% and more preferably less than 30% variation from the maximum), and in angular space away from the axis of the fiber, such that forward, 90 degrees (from axis of the fiber) and backward scattering intensities are almost the same (e.g., within 30% of each other, and preferably within 20% of each other).

In at least some embodiments, the variation of the integrated light intensity coming through sides of the optical fiber (i.e., the intensity variation of the diffused or scattered light) at the illumination wavelength is less than 30% for the target length of the optical fiber.

In at least some embodiments, the average scattering loss of the fiber is greater than 50 dB/km, and the scattering loss does not vary more than 30% (i.e., the scattering loss is within ±30% of the average scattering loss) over any given fiber segment of 0.2 m length. According to at least some embodiments, the average scattering loss of the fiber is greater than 50 dB/km, and the scattering loss does not vary more than 30% over the fiber segments of less than 0.05 m length. According to at least some embodiments, the average scattering loss of the fiber is greater than 50 dB/km, and the scattering loss does not vary more than 30% (i.e., ±30%) over the fiber segments 0.01 m length.

One advantageous feature of the fibers according to some embodiments of the present invention and of the illumination system utilising such fibers, is that the fiber acts as a light source, and illuminates the desired medium by uniformly scattering light through the sides of the fiber rather than delivering an intense and localized beam of light from the end of the fiber. Furthermore, in some embodiments, the use of fiber advantageously allows the electrically driven light source to remain distant from the point(s) of light delivery. This fact would be most beneficial in aqueous or potentially explosive environments where the electrical components could be located a safe distance from the conductive or reactive environment.

It is to be understood that both the foregoing general description and the following detailed description represent embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

Figure 1:
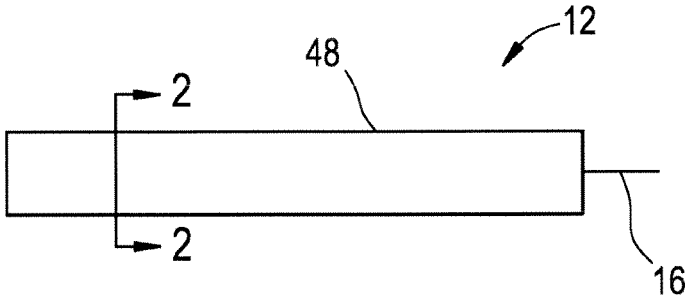
FIG. 1 is a schematic side view of a section of an example embodiment of light-diffusing optical fiber.

Additional features and advantages of the invention will be set forth in the detailed description which follows and will be apparent to those skilled in the art from the description or recognized by practicing the invention as described in the following description together with the claims and appended drawings.

DETAILED DESCRIPTION

Reference is now made in detail to the present preferred embodiments of the invention, examples of which are illustrated in the accompanying drawings. Whenever possible, like or similar reference numerals are used throughout the drawings to refer to like or similar parts. It should be understood that the embodiments disclosed herein are merely examples, each incorporating certain benefits of the present invention.

Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the embodiments described herein.

DEFINITIONS

Terms such as "horizontal," "vertical," "front," "back," etc., and the use of Cartesian Coordinates are for the sake of reference in the drawings and for ease of description and are not intended to be strictly limiting either in the description or in the claims as to an absolute orientation and/or direction.

In the description of the invention below, the following terms and phrases are used in connection to light diffusing fibers having nano-sized structures.

The "refractive index profile" is the relationship between the refractive index or the relative refractive index and the waveguide (fiber) radius.

The "relative refractive index percent" is defined as $$\Delta(r)\,\%=100\times[n(r)^2-n_{REF}^2)]2n(r)^2,$$

where n(r) is the refractive index at radius r, unless otherwise specified. The relative refractive index percent is defined at 850 nm unless otherwise specified. In one aspect, the reference index $n_{REEF}$ is silica glass with the refractive index of 1.452498 at 850 nm, in another aspect is the maximum refractive index of the cladding glass at 850 nm As used herein, the relative refractive index is represented by Δ and its values are given in units of "%", unless otherwise specified. In cases where the refractive index of a region is less than the reference index $n_{RFF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants.

Likewise, one or more other dopants which are not downdopants may be present in a region of an optical fiber having a negative relative refractive index.

The term "α-profile" or "alpha profile" refers to a relative refractive index profile, expressed in terms of Δ(r) which is in units of "%", where r is radius, which follows the equation, $$\Delta(r)=\Delta(r_o)(1-[|r-r_o|/(r_1-r_o)]^{\alpha}),$$

where $r_o$, is the point at which Δ(r) is maximum, r, is the point at which Δ(r) % is zero, and r is in the range $r_i \le r \le r_f$, where Δ is defined above, r, is the initial point of the α-profile, $r_f$ is the final point of the α-profile, and a is an exponent which is a real number.

As used herein, the term "parabolic" therefore includes substantially parabolically shaped refractive index profiles which may vary slightly from an α value of 2.0 at one or more points in the core, as well as profiles with minor variations and/or a centerline dip. In some exemplary embodiments, α is greater than 1.5 and less than 2.5, more preferably greater than 1.7 and 2.3 and even more preferably between 1.8 and 2.3 as measured at 850 nm In other embodiments, one or more segments of the refractive index profile have a substantially step index shape with an a value greater than 8, more preferably greater than 10 even more preferably greater than 20 as measured at 850 nm.

The term "nano-structured fiber region" describes the fiber having a region or area with a large number (greater than 50) of gas filled voids, or other nano-sized structures, e.g., more than 50, more than 100, or more than 200 voids in the cross-section of the fiber. The gas tilled voids may contain, for example, $SO_2$, Kr, Ar, $CO_2$, $N_2$, $O_2$, or mixture thereof The cross-sectional size (e.g., diameter) of nano-sized structures (e.g., voids) as described herein may vary from 10 nm to 1 μm (for example, 50 nm-500 nm), and the length may vary from 1 millimeter 50 meters (e.g., 2 mm to 5 meters, or 5 mm to 1 m range).

Figure 4A:
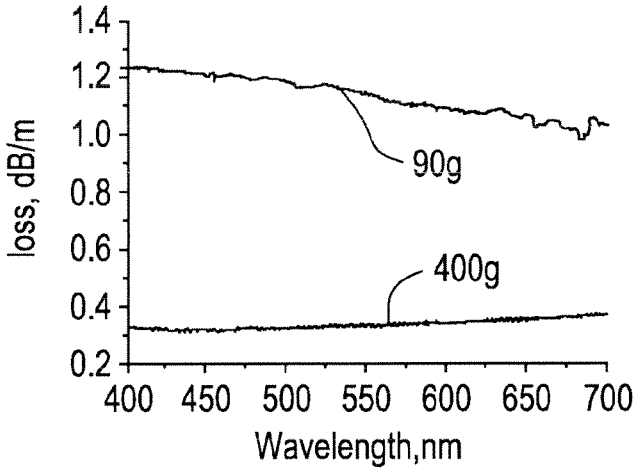
FIGS. 4A and 4B depict fiber attenuation (loss) in dB/m versus wavelength (nm)
Figure 4B:
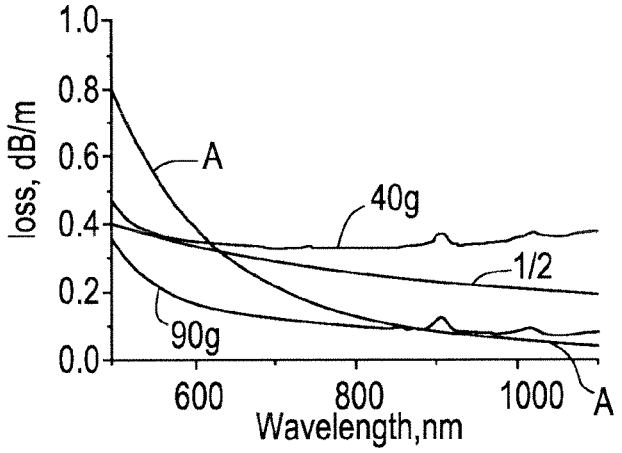

In standard single mode or multimode optical fibers, the losses at wavelengths less than 1300 nm are dominated by Rayleigh scattering. These Rayleigh scattering loss Ls is determined by the properties of the material and are typically about 20 dB/km for visible wavelengths (400-700 nm). Rayleigh scattering losses also have a strong wavelength dependence (i.e., $L_s \propto 1/\lambda^4$, see FIG. 4B, comparative fiber A), which means that at least about 1 km to 2 km of the fiber is needed to dissipate more than 95% of the input light. Shorter lengths of such fiber would result in lower illumination efficiency, while using long lengths (1 km to 2 km, or more) can be more costly and can be difficult to manage. The long lengths of fiber, when used in a bioreactor or other illumination system may be cumbersome to install.

In certain configurations of lighting applications it is desirable to use shorter lengths of fiber, for example, 1-100 meters. This requires an increase of scattering loss from the fiber, while being able to maintain good angular scattering properties (uniform dissipation of light away from the axis of the fiber) and good bending performance to avoid bright spots at fiber bends. A desirable attribute of at least some of the embodiments of present invention described herein is uniform and high illumination along the length of the fiber illuminator. Because the optical fiber is flexible, it allows a wide variety of the illumination shapes to be deployed. It is preferable to have no bright spots (due to elevated bend losses) at the bending points of the fiber, such that the illumination provided by the fiber does not vary by more than 30%, preferably less than 20% and more preferably less than 10%. For example, in at least some embodiments, the average scattering loss of the fiber is greater than 50 dB/km, and the scattering loss does not vary more than 30% (i.e., the scattering loss is within ±30% of the average scattering loss) over any given fiber segment of 0.2 m length. According to at least some embodiments, the average scattering loss of the fiber is greater than 50 dB/km, and the scattering loss does not vary more than 30% over the fiber segments of less than 0.05 m length. According to at least some embodiments, the average scattering loss of the fiber is greater than 50 dB/km, and the scattering loss does not vary more than 30% (i.e., ±30%) over the fiber segments 0.01 m length. According to at least some embodiments, the average scattering loss of the fiber is greater than 50 dB/km, and the scattering loss does not vary more than 20% (i.e., ±20%) and preferably by not more than 10% (i.e., ±10%) over the fiber segments 0.01 m length.

In at least some embodiments, the intensity variation of the integrated (diffused) light intensity coming through sides of the fiber at the illumination wavelength is less than 30% for target length of the fiber, which can be, for example, 0.02-100 m length. It is noted that the intensity of integrated light intensity through sides of the fiber at a specified illumination wavelength can be varied by incorporating fluorescence material in the cladding or coating. The wavelength of the light scattering by the fluorescent material is different from the wavelength of the light propagating in the fiber.

In some the following exemplary embodiments we describe fiber designs with a nano-structured fiber region (region with nano-sized structures) placed in the core area of the fiber, or very close to core. Some of the fiber embodiments have scattering losses in excess of 50 dB/km (for example, greater than 100 dB/km, greater than 200 dB/km, greater than 500 dB/km, greater than 1000 dB/km, greater than 3000 dB/km, greater than 5000 dB/km), the scattering loss (and thus illumination, or light radiated by these fibers) is uniform in angular space.

In order to reduce or to eliminate bright spots as bends in the fiber, it is desirable that the increase in attenuation at a 90° bend in the fiber is less than 5 dB/turn (for example, less than 3 dB/turn, less than 2 dB/turn, less than 1 dB/turn) when the bend diameter is less than 50 mm. In exemplary embodiment, these low bend losses are achieved at even smaller bend diameters, for example, less than 20 mm, less than 10 mm, and even less than 5 mm Preferably, the total increase in attenuation is less than 1 dB per 90 degree turn at a bend radius of 5 mm.

Preferably, according to some embodiments, the bending loss is equal to or is lower than intrinsic scattering loss from the core of the straight fiber. The intrinsic scattering is predominantly due to scattering from the nano-sized structures. Thus, according to at least the bend insensitive embodiments of optical fiber, the bend loss does not exceed the intrinsic scattering for the fiber. However, because the scattering level is a function of bending diameter, the bending deployment of the fiber depends on its scattering level. For example, in some of the embodiments, the fiber has a bend loss less than 3 dB/turn, preferably less than 2 dB/turn, and the fiber can be bent in an arc with a radius as small as 5 mm radius without forming bright spots.

Figure 2:
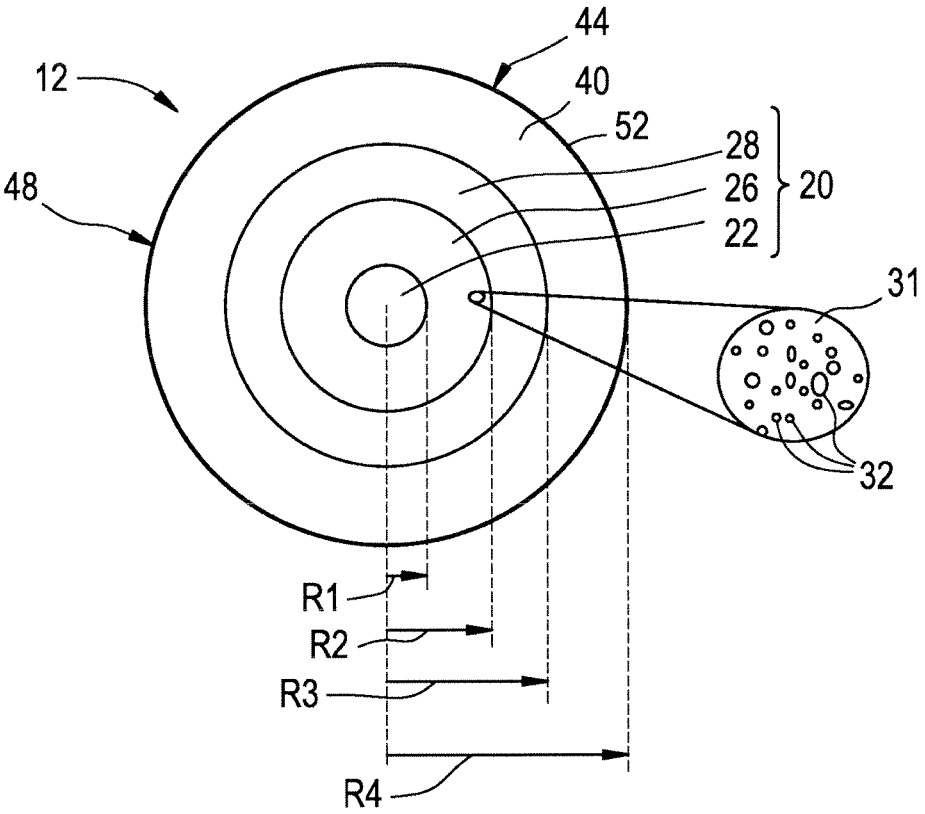
FIG. 2 is a schematic cross-section of the optical fiber of FIG. 1 as viewed along the direction 2-2.

FIG. 1 is a schematic side view of a section of an example embodiment of a light diffusing fiber with a plurality of voids in the core of the light diffusing optical fiber (hereinafter "fiber") 12 having a central axis ("centerline") 16. FIG. 2 is a schematic cross-section of light diffusing optical fiber 12 as viewed along the direction 2-2 in FIG. 1. Light diffusing fiber 12 can be, for example, any one of the various types of optical fiber with a nano-structured fiber region having periodic or non-periodic nano-sized structures 32 (for example voids). In an example embodiment, fiber 12 includes a core 20 divided into three sections or regions. These core regions are: a solid central portion 22, a nano-structured ring portion (inner annular core region) 26, and outer, solid portion 28 surrounding the inner annular core region 26. A cladding region 40 ("cladding") surrounds the annular core 20 and has an outer surface. The cladding 40 may have low refractive index to provide a high numerical aperture (NA). The cladding 40 can be, for example, a low index polymer such as UV or thermally curable fluoroacrylate or silicone.

An optional coating 44 surrounds the cladding 40. Coating 44 may include a low modulus primary coating layer and a high modulus secondary coating layer. In at least some embodiments, coating layer 44 comprises a polymer coating such as an acrylate-based or silicone based polymer. In at least some embodiments, the coating has a constant diameter along the length of the fiber.

In other exemplary embodiments described below, coating 44 is designed to enhance the distribution and/or the nature of "radiated light" that passes from core 20 through cladding 40. The outer surface of the cladding 40 or the of the outer of optional coating 44 represents the "sides" 48 of fiber 12 through which light traveling in the fiber is made to exit via scattering, as described herein.

A protective cover or sheath (not shown) optionally covers cladding 40. Fiber 12 may include a fluorinated cladding 40, but the fluorinated cladding is not needed if the fibers are to be used in short-length applications where leakage losses do not degrade the illumination properties.

In some exemplary embodiments, the core region 26 of light diffusing fiber 12 comprises a glass matrix ("glass") 31 with a plurality of non-periodically disposed nano-sized structures (e.g., "voids") 32 situated therein, such as the example voids shown in detail in the magnified inset of FIG. 2. In another example embodiment, voids 32 may be periodically disposed, such as in a photonic crystal optical fiber, wherein the voids typically have diameters between about $1\times10^{-6}$ m and $1\times10^{-5}$ m. Voids 32 may also be non-periodically or randomly disposed. In some exemplary embodiment, glass 31 in region 26 is fluorine-doped silica, while in other embodiment the glass is undoped pure silica. Preferably the diameters of the voids are at least 10 nm.

The nano-sized structures 32 scatter the light away from the core 20 and toward the outer surface of the fiber. The scattered light is then "diffused" through of the outer surface of the fiber 12 to provide the desired illumination. That is, most of the light is diffused (via scattering) through the sides of the fiber 12, along the fiber length. Preferably, the fiber emits substantially uniform radiation over its length, and the fiber has a scattering-induced attenuation of greater than 50 dB/km in the wavelength(s) of the emitted radiation (illumination wavelength). Preferably, the scattering-induced attenuation is greater than 100 dB/km for this wavelength. In some embodiments, the scattering-induced attenuation is greater than 500 dB/km for this wavelength, and in some embodiments is 1000 dB/km, greater than 2000 dB/km, and greater than 5000 dB/km. These high scattering losses are about 2.5 to 250 times higher than the Rayleigh scattering losses in standard single mode and multimode optical fibers.

Glass in core regions 22 and 28 may include updopants, such as Ge, Al, and/or P. By "non-periodically disposed" or "non-periodic distribution," it is meant that when one takes a cross-section of the optical fiber (such as shown in FIG. 2), the voids 32 are randomly or non-periodically distributed across a portion of the fiber. Similar cross sections taken at different points along the length of the fiber will reveal different cross-sectional void patterns, i.e., various cross sections will have different voids patterns, wherein the distributions of voids and sizes of voids do not match. That is, the voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. While not wishing to be bound by theory, it is believed that the voids extend less than 10 meters, and in many cases less than 1 meter along the length of the fiber.

The light diffusing fiber 12 as used herein in the illumination system discussed below can be made by methods which utilize preform consolidation conditions which result in a significant amount of gases being trapped in the consolidated glass blank, thereby causing the formation of voids in the consolidated glass optical fiber preform. Rather than taking steps to remove these voids, the resultant preform is used to form an optical fiber with voids, or nano-sized structures, therein. The resultant fiber's nano-sized structures or voids are utilized to scatter or guide the light out of the fiber, via its sides, along the fiber length. That is, the light is guided away from the core 20, through the outer surface of the fiber, to provide the desired illumination.

As used herein, the diameter of a nano-sized structure such as void is the longest line segment whose endpoints a) when the optical fiber is viewed in perpendicular cross-section transverse to the longitudinal axis of the fiber. Method of making optical fibers with nano-sized voids is described, for example, in U.S. patent application Ser. No. 11/583,098, which is incorporated herein by reference.

As described above, in some embodiments of fiber 12, core sections 22 and 28 comprise silica doped with germanium, i.e., germania-doped silica. Dopants other than germanium, singly or in combination, may be employed within the core, and particularly at or near the centerline 16, of the optical fiber to obtain the desired refractive index and density. In at least some embodiments, the relative refractive index profile of the optical fiber disclosed herein is non-negative in sections 22 and 28. These dopants may be, for example, Al, Ti, P, Ge, or a combination thereof In at least some embodiments, the optical fiber contains no index-decreasing dopants in the core. In some embodiments, the relative refractive index profile of the optical fiber disclosed herein is non-negative in sections 22, 24 and 28.

In some examples of fiber 12 as used herein, the core 20 comprises pure silica. In one embodiment, a preferred attribute of the fiber is the ability to scatter light out of the fiber (to diffuse light) in the desired spectral range to which biological material is sensitive. In another embodiment, the scattered light may be used for decorative accents and white light applications. The amount of the loss via scattering can be increased by changing the properties of the glass in the fiber, the width of the nano-structured region 26, and the size and the density of the nano-sized structures.

In some examples of fiber 12 as used herein, core 20 is a graded-index core, and preferably, the refractive index profile of the core has a parabolic (or substantially parabolic) shape; for example, in some embodiments, the refractive index profile of core 20 has an a shape with an a value of about 2, preferably between 1.8 and 2.3 as measured at 850 nm. In other embodiments, one or more segments of the refractive index profile have a substantially step index shape with an a value greater than 8, more preferably greater than 10 even more preferably greater than 20 as measured at 850 nm. In some embodiments, the refractive index of the cure may have a centerline dip, wherein the maximum refractive index of the core, and the maximum refractive index of the entire optical fiber, is located a small distance away from centerline 16, but in other embodiments the refractive index of the core has no centerline dip, and the maximum refractive index of the core, and the maximum refractive index of the entire optical fiber, is located at the centerline.

Figure 3A:
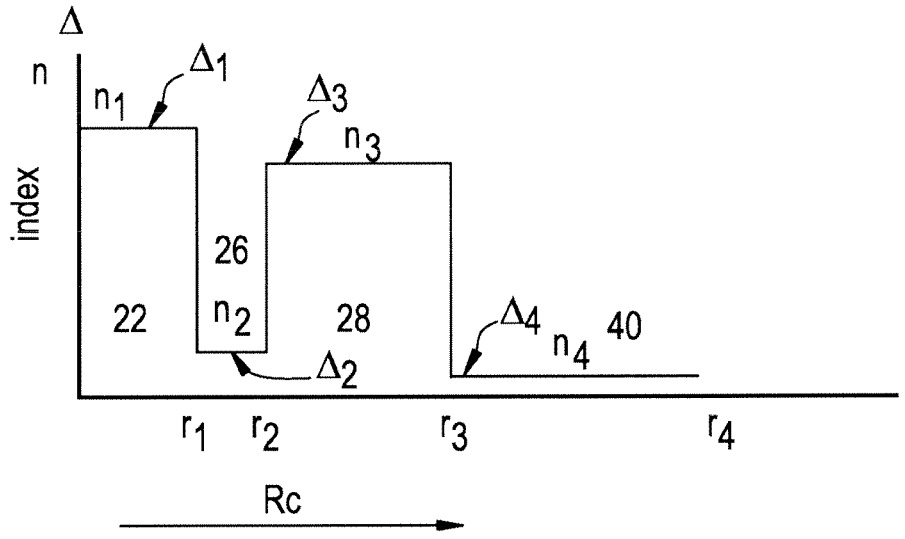
FIG. 3A is a schematic illustration of relative refractive index plot versus fiber radius for an exemplary embodiment of light diffusing fiber.

In an exemplary embodiment, fiber 12 has a silica-based core 20 and depressed index (relative to silica) polymer cladding 40. The low index polymer cladding 40 preferably has a relative refractive index that is negative, more preferably less than −0.5% and even more preferably less than −1%. In some exemplary embodiments cladding 40 has thickness of 20 μm or more. In some exemplary embodiments cladding 40 has a lowed refractive index than than the core, and a thickness of 10 μm or more (e.g., 20 μm or more). In some exemplary embodiments, the cladding has an outer diameter 2 times Rmax, e.g., of about 125 μm (e.g., 120 μm to 130 μm, or 123 μm to 128 μm). In other embodiments the cladding has the diameter that is less than 120 for example 60 or 80 μm. In other embodiments the outer diameter of the cladding is greater than 200 μm, greater than 300 μm, or greater than 500 μm. In some embodiments, the outer diameter of the cladding has a constant diameter along the length of fiber 12. In some embodiments, the refractive index of fiber 12 has radial symmetry. Preferably, the outer diameter 2R3 of core 20 is constant along the length of the fiber. Preferably the outer diameters of core sections 22, 26, 28 are also constant along the length of the fiber. By constant, we mean that the variations in the diameter with respect to the mean value are less than 10%, preferably less than 5% and more preferably less than 2%. FIG. 3A is a plot of the exemplary relative refractive index Δ versus fiber radius for an example fiber 12 shown in FIG. 2 (solid line). The core 20 may also have a graded core profile, with α-profile having, for example, α-value between 1.8 and 2.3 (e.g., 1.8 to 2.1).

FIG. 3A is a plot of the exemplary relative refractive index Δ versus fiber radius for an example fiber 12 shown in FIG. 2 (solid line). The core 20 may also have a graded core profile, characterized, for example, by an α-value between 1.7 and 2.3 (e.g., 1.8 to 2.3). An alternative exemplary refractive index profile is illustrated by the dashed lines. Core region 22 extends radially outwardly from the centerline to its outer radius, R1 and has a relative refractive index profile $\Delta_1(r)$ corresponding to a maximum refractive index n1 (and relative refractive index percent $\Delta_{1MAX}$). In this embodiment, the reference index $n_{REF}$ is the refractive index at the cladding. The second core region (nano-structured region) 26 has minimum refractive index n2, a relative refractive index profile Δ2(r), a maximum relative refractive index $\Delta 2_{MAX}$, and a minimum relative refractive index $\Delta 2_{MIN}$, where in some embodiments $\Delta 2_{MAX}=\Delta 2_{MIN}$. The third core region 28 has a maximum refractive index n3, a a relative refractive index profile Δ3(r) with a maximum relative refractive index $\Delta 3_{MAX}$ and a minimum relative refractive index $\Delta 3_{MIN}$, where in some embodiments $\Delta 3_{MAX}=\Delta 3_{MIN}$. In this embodiment the annular cladding 40 has a refractive index n4, a relative refractive index profile Δ4(r) with a maximum relative refractive index $\Delta 4_{MAX}$, and a minimum relative refractive index $\Delta 4_{MIN}$. In some embodiments $\Delta 4_{MAX}=\Delta 4_{MIN}$. In some embodiments, $\Delta 1_{MAX}>\Delta 4_{MAX}$ and $\Delta 3_{MAX}>\Delta 4_{MAX}$ . In some embodiments $\Delta 2_{MIN}>\Delta 4_{MAX}$ In the embodiment shown in FIGS. 2 and 3A, $\Delta 1_{MAX}>\Delta 3_{MAX}>\Delta 2_{MAX}>\Delta 4_{MAX}$ In this embodiment the refractive indices of the regions have the following relationship n1>n3>n2>n4.

In some embodiments, core regions 22, 28 have a substantially constant refractive index profile, as shown in FIG. 3A with a constant Δ1(r) and Δ3(r). In some of these embodiments, Δ2(r) is either slightly positive (0<Δ2(r)<0.1%), negative (−0.1%<Δ2(r)<0), or 0%. In some embodiments the absolute magnitude of Δ2(r) is less than 0.1%, preferably less than 0.05%. In some embodiments, the outer cladding region 40 has a substantially constant refractive index profile, as shown in FIG. 3A with a constant Δ4(r). In some of these embodiments, Δ4(r)=0%. The core section 22 has a refractive index where Δ1(r)≥0%. In some embodiments, the void-filled region 26 has a relative refractive index profile Δ2(r) having a negative refractive index with absolute magnitude less than 0.05%, and Δ3(r) of the core region 28 can be, for example, positive or zero. In at least some embodiments, n1>n2 and n3>n4.

In some embodiments the cladding 40 has a refractive index −0.05%<Δ4(r)<0.05%. In other embodiments, the cladding 40 and the core portions portion 20, 26, and 28 may comprise pure (undoped) silica.

In some embodiments, the cladding 40 comprises pure or F-doped silica. In some embodiments, the cladding 40 comprises pure low index polymer. In some embodiments, nano-structured region 26 comprises pure silica comprising a plurality of voids 32. Preferably, the minimum relative refractive index and the average effective relative refractive index, taking into account the presence of any voids, of nano-structured region 26 are both less than −0.1%. The voids or voids 32 may contain one or more gases, such as argon, nitrogen, oxygen, krypton, or $SO_2$ or can contain a vacuum with substantially no gas. However, regardless of the presence or absence of any gas, the average refractive index in nano-structured region 26 is lowered due to the presence of voids 32. Voids 32 can be randomly or non-periodically disposed in the nano-structured region 26, and in other embodiments, the voids are disposed periodically therein.

In some embodiments, the plurality of voids 32 comprises a plurality of non-periodically disposed voids and a plurality of periodically disposed voids.

In example embodiments, core section 22 comprises germania doped silica, core inner annular region 28 comprises pure silica, and the cladding annular region 40 comprises a glass or a low index polymer. In some of these embodiments, nano-structured region 26 comprises a plurality of voids 32 in pure silica; and in yet others of these embodiments, nano-structured region 26 comprises a plurality of voids 32 in fluorine-doped silica.

In some embodiments, the outer radius, Rc, of core is greater than 10 μm and less than 600 μm. In some embodiments, the outer radius Rc of core is greater than 30 μm and/or less than 400 82 m. For example, Rc may be 125 μm to 300 μm. In other embodiments, the outer radius Rc of the core 20 (please note that in the embodiment shown in FIG. 3A, Rc=R3) is larger than 50 μm and less than 250 μm. The central portion 22 of the core 20 has a radius in the range $0.1Rc \le R_1 < 0.9Rc$, preferably $0.5Rc \le R_1 \le 09Rc$. The width W2 of the nano-structured ring region 26 is preferably 0.05Rc≤W2≤0.9Rc, preferably 0.1Rc≤W2≤0.9Rc, and in some embodiments 0.5Rc≤W2≤0.9Rc (a wider nano-structured region gives a higher scattering-induced attenuation, for the same density of nano-sized structures). The solid glass core region 28 has a width Ws=W3 such that 0.1Rc>W3>0.9Rc. Each section of the core 20 comprises silica based glass. The radial width $W_2$ of nano-structured region 26 is preferably greater than 1 μm. For example, $W_2$ may be 5 μm to 300 μm, and preferably 200 μm or less. In some embodiments, $W_2$ is greater than 2 μm and less than 100 μm. In other embodiments, W2 is greater than 2 μm and less than 50 μm. In other embodiments, $W_2$ is greater than 2 μm and less than 20 μm. In some embodiments, $W_2$ is at least 7 μm. In other embodiments, $W_2$ is greater than 2 μm and less than 12 μm. The width $W_3$ of core region 28 is (R3−R2) and its midpoint $R_{3MID}$ is (R2+R3)/2. In some embodiments, $W_3$ is greater than 1 um and less than 100 μm.

The numerical aperture (NA) of fiber 12 is preferably equal to or greater than the NA of a light source directing light into the fiber. Preferably the numerical aperture (NA) of fiber 12 is greater than 0.2, in some embodiments greater than 0.3, and even more preferably greater than 0.4.

In some embodiments, the core outer radius R1 of the first core region 22 is preferably not less than 24 μm and not more than 50 μm, i.e. the core diameter is between about 48 and 100 μm. In other embodiments, R1>24 microns; in still other embodiments, R1>30 microns; in yet other embodiments, R1>40 microns.

In some embodiments, $|\Delta_2(r)|<0.025\%$ for more than 50% of the radial width of the annular inner portion 26, and in other embodiments $|\Delta_2(r)|<0.01\%$ for more than 50% of the radial width of region 26. The depressed-index annular portion 26 begins where the relative refractive index of the cladding first reaches a value of less than −0.05%, going radially outwardly from the centerline. In some embodiments, the cladding 40 has a relative refractive index profile Δ4(r) having a maximum absolute magnitude less than 0.1%, and in this embodiment $\Delta 4_{MAX}<0.05\%$ and $\Delta 4_{MIN}>-0.05\%$, and the depressed-index annular portion 26 ends where the outermost void is found.

Cladding structure 40 extends to a radius R4, which is also the outermost periphery of the optical fiber. In some embodiments, the width of the cladding, R4−R3, is greater than 20 μm; in other embodiments R4−R3 is at least 50 μm, and in some embodiments, R4−R3 is at least 70 μm.

In another embodiment, the entire core 20 is nano-structured (filled with voids, for example), and the core 20 is surrounded by the cladding 40. The core 20 may have a "step" refractive index delta, or may have a graded core profile, with α-profile having, for example, α-value between 1.8 and 2.3.

Preparation of optical preform and fibers for examples shown in FIGS. 3C, 4A and 6-8 were as follows: In this exemplary embodiment, 470 grams of $SiO_2$ (0.5 g/cc density) soot were deposited via outside vapor deposition (OVD) onto a fully consolidated 1 meter long, 20 mm diameter pure silica void-free core cane, resulting in a preform assembly (sometimes referred to as a preform, or an optical preform) comprising a consolidated void-free silica core region which was surrounded by a soot silica region. The soot cladding of this perform assembly was then sintered as follows. The preform assembly was first dried for 2 hours in an atmosphere comprising helium and 3 percent chlorine (all percent gases by volume) at 1100° C. in the upper-zone part of the furnace, followed by down driving at 200 mm/min (corresponding to approximately a 100° C./min temperature increase for the outside of the soot preform during the downdrive process) through a hot zone set at approximately 1500° C. in a 100 percent $SO_2$ (by volume) sintering atmosphere. The preform assembly was then down driven again (i.e., a second time) through the hot zone at the rate of 100 mm/min (corresponding to an approximately 50° C./min temperature increase for the outside of the soot preform during the downdrive process). The preform assembly was then down driven again (i.e., a third time) through the hot zone at the rate of 50 mm/min (corresponding to an approximately 25° C./min temperature increase for the outside of the soot preform during the downdrive process). The preform assembly was then down driven again (i.e., a fourth time) through the hot zone at the rate of 25 mm/min (corresponding to an approximately 12.5° C./min temperature increase for the outside of the soot preform during the downdrive process), then finally sintered at 6 mm/min (approximately 3° C./min heat up rate) in order to sinter the soot into an $SO_2$-seeded silica overclad preform. Following each downdrive step, the preform assembly was updriven at 200 mm/min into the upper-zone part of the furnace (which remained set at 1100° C.). The first series of higher downfeed rate are employed to glaze the outside of the optical fiber preform, which facilitates trapping of the gases in the preform. The preform was then placed for 24 hours in an argon purged holding oven set at 1000° C. to outgas any remaining helium in the preform. This preform was then redrawn in an argon atmosphere on a conventional graphite redraw furnace set at approximately 1700° C. into void-free $SiO_2$ core, $SO_2$-seeded (i.e., containing the non-periodically located voids containing $SO_2$ gas) silica overclad canes which were 10 mm in diameter and 1 meter long.

One of the 10 mm canes was placed back in a lathe where about 190 grams of additional $SiO_2$ (0.52 g/cc density) soot was deposited via OVD. The soot of this cladding (which may be called overcladding) for this assembly was then sintered as follows. The assembly was first dried for 2 hours in an atmosphere consisting of helium and 3 percent chlorine at 1100° C., followed by down driving at 5 mm/min through a hot zone set at 1500° C. in a 100% helium (by volume) atmosphere in order to sinter the soot to a germania containing void-free silica core, silica $SO_2$-seeded ring (i.e. silica with voids containing $SO_2$), and void-free overclad preform. The preform was placed for 24 hours in an argon purged holding oven set at 1000° C. to outgas any remaining helium from the preform. The optical fiber preform was drawn to 3 km lengths of 125 micron diameter optical fiber at approximately 1900° C. to 2000° C. in a helium atmosphere on a graphite resistance furnace. The temperature of the optical preform was controlled by monitoring and controlling the optical fiber tension; in this embodiment the fiber tension was held at one value between 30 and 600 grams during each portion (e.g., 3 km lengths) of a fiber draw run. The fiber was coated with a low index silicon based coating during the draw process.

Another 10 mm void-free silica core $SO_2$-seeded silica overclad canes described above (i.e., a second cane) was utilized to manufacture the optical preform and fibers for examples shown in FIG. 4B. More specifically, the second 10 mm void-free silica core $SO_2$-seeded silica overclad cane was placed back in a lathe where about 3750 grams of additional $SiO_2$ (0.67 g/cc density) soot are deposited via OVD. The soot of this cladding (which may be called overcladding for this assembly) was then sintered as follows. The assembly was first dried for 2 hours in an atmosphere comprising of helium and 3 percent chlorine at 1100° C., followed by down driving at 5 mm/min through a hot zone set at 1500° C. in a 100% helium (by volume) atmosphere in order to sinter the soot so as to produce preform comprising germania containing void-free silica core, silica $SO_2$-seeded ring (i.e. silica with voids containing $SO_2$), and void-free overclad. The resultant optical fiber preform was placed for 24 hours in an argon purged holding oven set at 1000° C. to outgas any remaining helium from the preform. Finally, the optical fiber preform was drawn to 5 km lengths of 125 micron diameter optical fiber and coated with the low index polymer as described above.

Figure 3B:
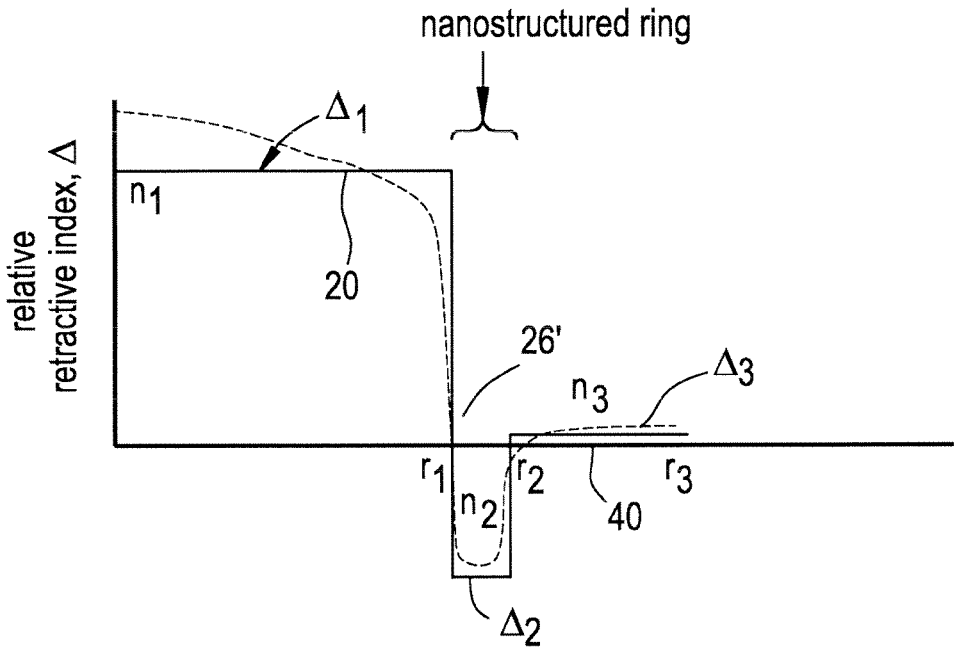
FIG. 3B is a schematic illustration of relative refractive index plot versus fiber radius for another exemplary embodiment of light diffusing fiber.

FIG. 3B illustrates schematically yet another exemplary embodiment of light diffusing fiber 12. The fiber of FIG. 3B includes a core 20 with a relative refractive index $\Delta_1$, a nano-structured region 26' situated over and surrounding the core 20. The core 20 may have a "step" index profile, or a graded core profile, with $\alpha$-profile having, for example, $\alpha$-value between 1.8 and 2.3.

In this exemplary embodiment (see FIG. 3B) the nano-structured region 26' is an annular ring with a plurality of voids 32. In this embodiment, the width of region 26' can be as small as 1-2 um, and may have a negative average relative refractive index $\Delta_2$. Cladding 40 surrounds the nano-structured region 26'. The (radial) width of cladding 40 may be as small as 1 μm, and the cladding may have either a negative, a positive or 0% relative refractive index, (relative to pure silica). The main difference between examples in FIGS. 3A and 3B is that nano-structured region in shown in FIG. 3A is located in the core 20 of the light diffusing fiber 12, and in FIG. 3B it is located at the core/clad interface. The depressed-index annular portion 26' begins where the relative refractive index of the core first reaches a value of less than −0.05%, going radially outwardly from the centerline. In the embodiment of FIG. 3B, the cladding 40 has a relative refractive index profile $\Delta 3(r)$ having a maximum absolute magnitude less than 0.1%, and in this embodiment $\Delta 3_{MAX}<0.05\%$ and $\Delta 3_{MIN}>-0.05\%$, and the depressed-index annular portion 26 ends where the outmost void occurs in the void-filled region.

Figure 3C:
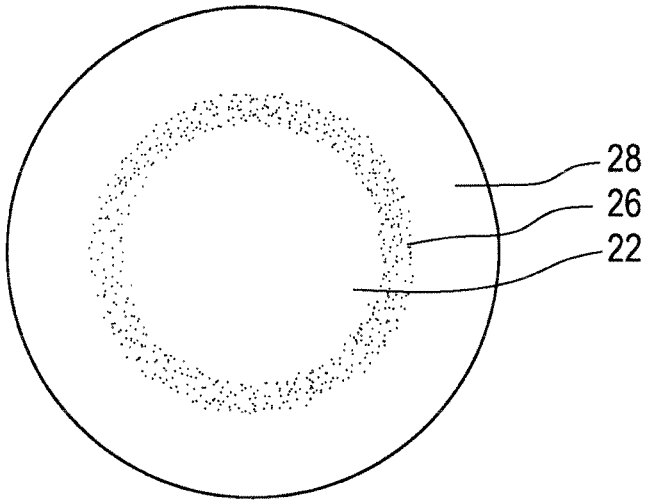
FIG. 3C is illustrates another exemplary embodiment of a light diffusing fiber.

In the embodiment shown in FIG. 3B the index of refraction of the core 20 is greater than the index of refraction n2 of the annular region 26', and the index of refraction n1 of the cladding 40 is also greater than the index of refraction n2. FIG. 3C illustrates a core 20 of one embodiment of an optical fiber 12 that has been made. This fiber has a first core region 22 with an outer radius R1 of about 33.4 μm, a nano-structured region 26 with an outer radius R2=42.8 μm, a third core region 28 with an outer radius R3=62.5 μm, and a polymer cladding 40 with an outer radius R4 (not shown) of 82.5 μm). In this embodiment, the material of the core is pure silica (undoped silica), the material for cladding was low index polymer (e.g., UV curable silicone having a refractive index of 1.413 available from Dow-Corning of Midland, Mich. under product name Q3-6696) which, in conjunction with the glass core, resulted in fiber NA of 0.3. The optical fiber 12 had a relatively flat (weak) dependence on wavelength, compared to standard single-mode transmission fiber, such as for example SMF-28e$^R$ fiber, FIG. 4B. In standard single mode (such as SMF-28$^R$) or multimode optical fibers, the losses at wavelengths less than 1300 nm are dominated by Rayleigh scattering. These Rayleigh scattering losses are determined by the properties of the material and are typically about 20 dB/km for visible wavelengths (400-700 nm). The wavelength dependence of Rayleigh scattering losses is proportional to $\lambda^{-p}$ with $p\approx4$. The exponent of the wavelength dependent scattering losses in the fiber comprising at least one nanostructured region is less than 2, preferably less than 1 over at least 80% (for example greater than 90%) in the 400 nm-1100 nm wavelength range. The average spectral attenuation from 400 nm to 1100 nm was about 0.4 dB/m when the fiber was drawn with at 40 g tension and was about 0.1 dB/m when the fiber 12 was drawn at 90 g tension. In this embodiment, the nano-sized structures contain $SO_2$ gas. Applicants found that filled $SO_2$ voids in the nano-structured ring greatly contribute to scattering. Furthermore, when $SO_2$ gas was used to form the nano-structures, it has been discovered that this gas allows a thermally reversible loss to be obtained, i.e., below 600° C. the nano-structured fiber scatters light, but above 600° C. the same fiber will guide light. This unique behavior that $SO_2$ imparts is also reversible, in that upon cooling the same fiber below 600° C., the fiber 12 will act as light diffusing fiber and will again generate an observable scattering effect.

In preferred embodiments, the uniformity of illumination along the fiber length is controlled such that the minimum scattering illumination intensity is not less than 0.7 of the maximum scattering illumination intensity, by controlling fiber tension during the draw process; or by selecting the appropriate draw tension (e.g., between 30 g and 100 g, or between 40 g and 90 g)

Accordingly, according to some embodiments, a method of making a light diffusing fiber to control uniformity of illumination along the fiber length wherein the minimum scattering illumination intensity is not less than 0.7 the maximum scattering illumination intensity includes the step of controlling fiber tension during draw process.

The presence of the nano-sized structures in the light diffusing fiber 12 creates losses due to optical scattering, and the light scattering through the outer surface of the fiber can be used for illumination purposes. FIG. 4A is a plot of the attenuation (loss) in dB/m versus wavelength (nm) for the fiber of FIG. 3C (fiber with $SO_2$ gas filled voids). FIG. 4A illustrates that (i) light diffusing fibers 12 can achieve very large scattering losses (and thus can provide high illumination intensity) in the visible wavelength range. The scattering losses of the optical fiber 12 also have weak wavelength dependence ($L_s$ is proportional to $1/\lambda^{-p}$, where p is less than 2, preferably less than 1, and even more preferably less than 0.5), as compared to regular 125 μm graded index core multi mode comparative fiber A (fiber A is a step index multimode fiber without the nano-structured region) which has Rayleigh scattering losses of about 0.02 dB/m in the visible wavelength range, or about 20 dB/km at the wavelength of 500 nm and relatively strong wavelength dependence of $1/\lambda^4$). The effect of the tension for the fibers 12 is also illustrated in FIGS. 4A-4B. More specifically FIGS. 4A-4B illustrate that the higher fiber draw tension results in lower scattering losses, and that lower fiber draw tension results in a fiber section with higher scattering loss, i.e., stronger illumination). FIG. 4A depicts attenuation as function of wavelength for light diffusing fiber 12 (with voids in the core) drawn at different fiber tensions of 90 and 400 g. FIG. 4B depicts attenuation as function of wavelength for different light diffusing fiber 12 (with voids in the core) drawn at different fiber tension, 90 and 40 g, a comparative multi mode fiber (fiber A) with normalized loss, and a theoretical fiber with $1/\lambda$, loss dependence. (Note, FIG. 4B graph describes wavelength dependence of the loss. In this example, in order to compare the slope of the scattering for the light fiber 12 and fiber A, the loss of low loss fiber (fiber A) was multiplied by a factor of 20, so that the two plots can be easily shown on the same figure.) Without being bound to any particular theory, it is believed that the increase in the scattering losses when the draw tension decreases, for example from 90 g to 40 g, is due to an increase in the average diameter of the nanostructures. Therefore, this effect of fiber tension could be used to produce constant attenuation (illumination intensity) along the length of the fiber by varying the fiber tension during the draw process. For example, a first fiber segment drawn at high tension, T1, with a loss of $\alpha_1$ dB/m and length, L1, will attenuate the optical power from an input level P0 to P0 $\exp(-\alpha_1 * L1/4.343)$. A second fiber segment optically coupled to the first fiber segment and drawn at lower tension T2 with a loss of $\alpha_2$ dB/m and length L2 will further attenuate the optical power from P0 exp($-\alpha_1$*L1/4.343) to P0 exp($-\alpha_1$*L1/4.343) exp($-\alpha_2$*L2/4.343). The lengths and attenuations of the first and second fiber segments can be adjusted to provide uniform intensity along the length of the concatenated fiber.

Figure 5:
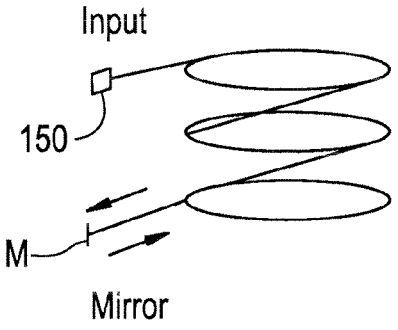
FIG. 5 illustrates a fiber deployment that utilizes two light passes within a single fiber.

One of the advantages of light diffusing fibers 12 is their ability to provide uniform illumination along the length of the light diffusing fiber. FIG. 5 illustrates the arrangement of fiber 12 that results in uniform illumination along the length of the fiber and utilizes two light passes in the single light diffusing fiber 12. In this arrangement a mirror M is placed at the end of the light diffusing fiber 12. The input light provided by the light source 150 to the light diffusing fiber 12 propagates along the axis of the light diffusing fiber 12, and the remaining light is reflected by the mirror and propagates back along the axis of the fiber 12 towards the input. If the attenuation and length of the fiber 12 are chosen properly, the light output power provided back to the light source is less than a 2%-5% percent of the original light power. The scattering loss intensity for fiber with constant loss distribution (see FIG. 4A) may be higher in the beginning of the fiber and weaker at the end of the fiber. However, if the light diffusing fiber 12 is drawn with a periodically controlled tension (the tension value is related to the furnace temperature, which may vary from 1800° C. to 2100° C.) such that the scattering losses are lower at the beginning of the fiber, where the intensity is high, and higher at the end, where the intensity is lower, the resulting scattering intensity can be made less variable, or constant (for example, as shown in FIG, 6A, example C). The fiber draw tension may be controlled and varied, for example, between 40 g and 400 g, thus providing a wide range of scattering-induced attenuation (e.g., up to 6 times). The mirror M in FIG. 5 may also be replaced by a second light source with power density output that similar to that of the first light source (within a factor of 2, i.e., in the range of 50% to 200%) to not only create a more uniform illumination, but also to increase the quantity of light scattered by the fiber.

Figure 6A:
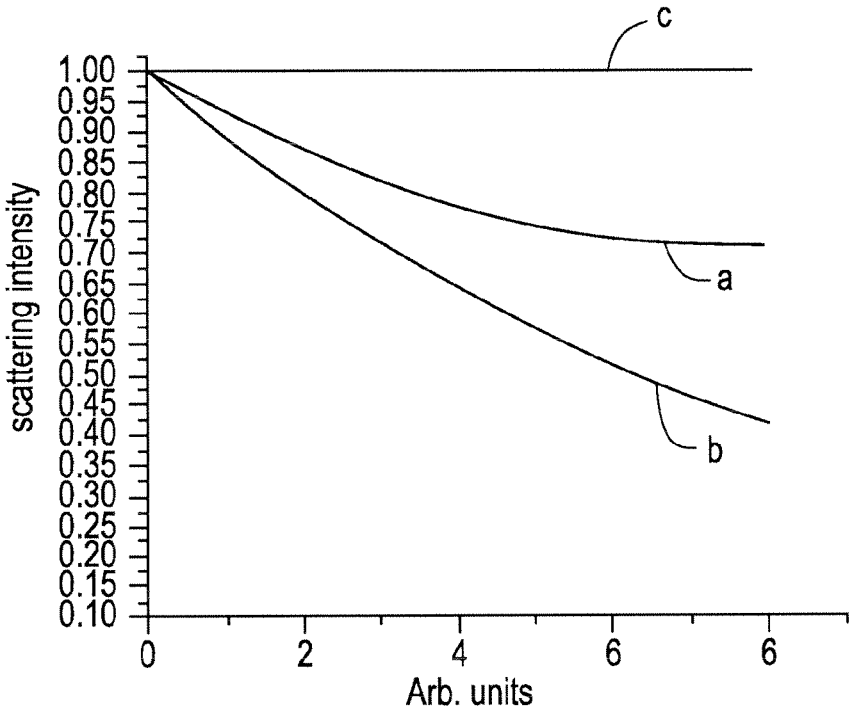
FIG. 6A illustrates the intensity distribution along the fiber when the fiber made with uniform tension (example A) and variable tension (example B)
Figure 6B:
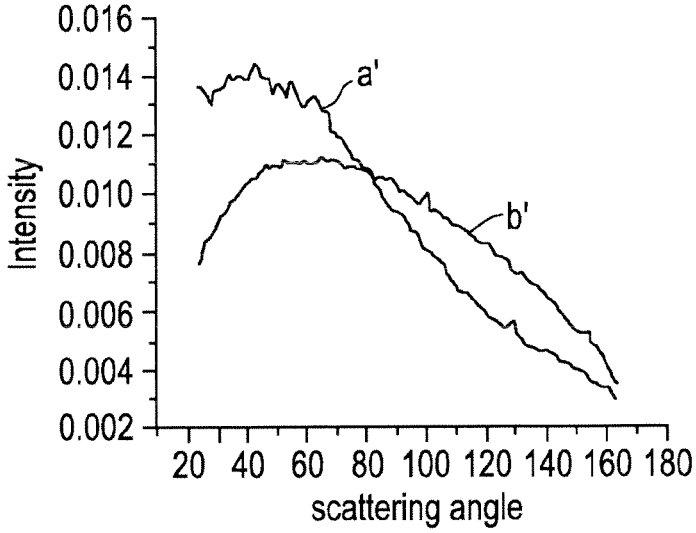
FIG. 6B illustrates the scattering distribution function with white ink and without ink.
Figure 7:
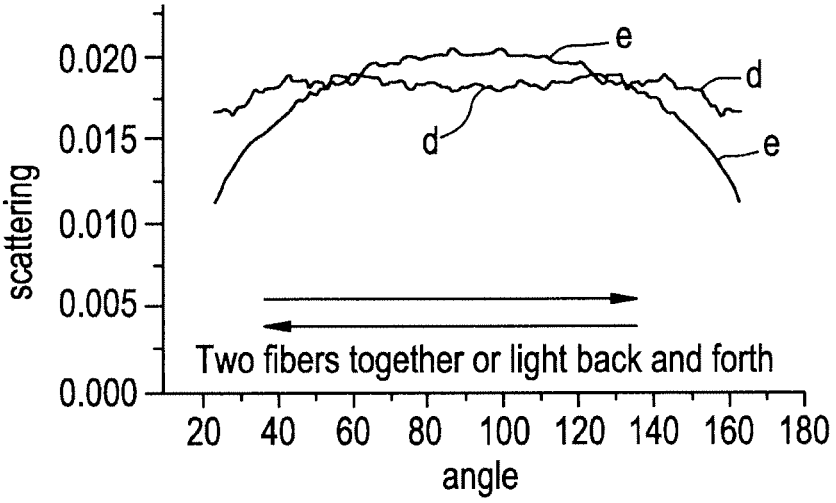
FIG. 7 illustrates scattering for fiber shown in FIG. 5 (with reflective mirror at coupled to the rear end of the fiber), and also for a fiber utilizing white ink in its coating.

One aspect of an exemplary embodiment of the bioreactor/illumination system is that the angular distribution of the scattering light intensity is uniform or nearly uniform in angular space. The light scattering axially from the surface of the fiber has a variation relative to the mean scattering intensity that is less than 50%, preferably less than 30%, preferably less than 20% and more preferably less than 10%. The dominant scattering mechanism in conventional silica-based optical fibers without nano-sized structures is Rayleigh scattering, which has a broad angular distribution. Fibers 12 in which there are additional scattering losses due to voids in nano-structured ring may have a strong forward component, as shown in FIG. 6A (embodiments a and b) and FIG. 6B (embodiment a'). This distribution, however, can be corrected by placing a scattering material on the top of coating of the light diffusing fiber 12. Light diffusing fibers made with coating containing $TiO_2$ based white ink (see FIG. 6B, embodiment b') provide an angular distribution of scattered light that is significantly less forward biased. With an additional thicker layer of $TiO_2$ ink (e.g., 1-5 μm) it is possible to further reduce the forward scattering component, thereby increasing the uniformity of the angular intensity distribution. However, as shown in FIG. 7, if the illuminator design may utilize fiber(s) optically coupled to a back reflective mirror or additional light source (see FIG. 5), so even if the fiber has no $TiO_2$ based white ink coating layer this configuration provides relatively flat (i.e., very uniform) angular scattering intensity (see FIG. 6A). In some embodiments, a controlled variation of the ink coating (either thickness of the ink coating or variation of ink concentration in the coating) along the length of the fiber will provide an additional way of making more uniform variation in the intensity of the light scattered form the fiber at large angles (more than 15 degrees).

In some embodiments the ink can be a fluorescent material that converts scattered light to a longer wavelength of light. In some embodiments white light can be emitted (diffused out of the outer surface) by the fiber 12 by coupling the light diffusing fiber 12 with such a coating to a UV light source, for example a 405 nm or 445 nm diode laser. The angular distribution of fluorescence white light in the exemplary embodiments is substantially uniform (e.g., 25% to 400%, preferably 50% to 200%, even more preferably 50% to 150%, or 70% to 130%, or 80% to 120% in angular space).

Lighting System Configuration

Efficient coupling to low cost light sources such as light emitting diodes (LEDs) or sunlight requires the fiber to have a high NA and large core diameter. With a design similar to that shown in FIG. 2 the size of the multimode core 20 can be maximized, and may have a radius up to 500 μm. The cladding thickness may be much smaller, for example, about 15-30 μm (e.g., about 20 μm). For example, according to one embodiment, a plurality of light diffusing fibers 12 may be wound around a support structure, and each light diffusing optical fiber may be optically coupled to either the light source or a plurality of light sources. The plurality of light diffusing optical fibers 12 can be bundled together in at least one of: a ribbon, ribbon stack, or a round bundle. The fiber bundles or ribbons (i.e., collections of multiple fibers) can also be arranged in the shape of the light source in order to increase coupling efficiency. A typical bundle/ribbon structure can include, for example, 2-36 light diffusing fibers 12, or may include up to several hundred fibers 12. Cable designs which are assemblies of multiple fibers are well known and could include ribbons, collections of multiple ribbons, or fibers gathered into a tube. Such fibers may include one or more light diffusing fibers 12.

Single Fibers

Figure 8A:
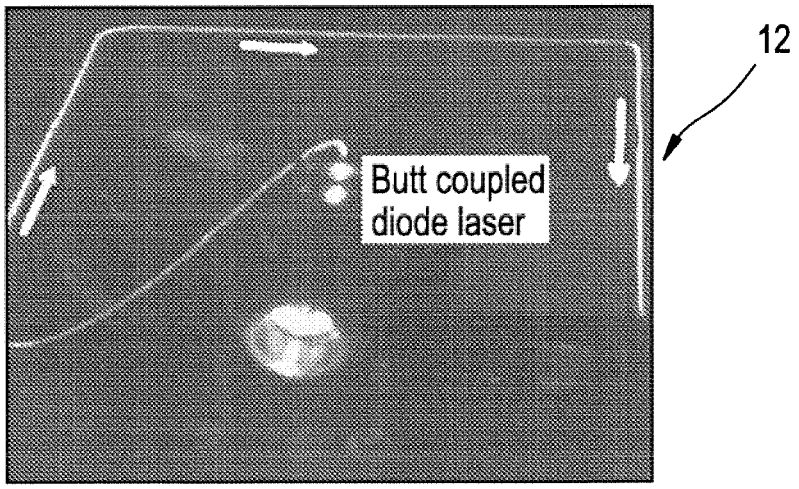
FIG. 8A illustrates an exemplary embodiment of illumination system.

A bright continuous light source coupled into a light diffusing fiber can be utilized for different application such as signs, or display illumination. If the illumination system utilizes a single fiber 12 with core diameter of 125-300 μm, a multimode laser diode could be used as a light source for providing light into the fiber 12. An exemplary lighting fixture (bright perimeter illuminator for the display screen) using a single fiber 12 with a reflective coating directing light in one direction is shown in FIG. 8A. According to some embodiments, single or multiple fiber illumination with the light diffusing fiber(s) 12 can be utilized in aqueous environments, for example for lighting boat docks, fishing lines or lures, and related applications where the small flexible size of the light diffusing fiber 12 and the ability to be safely immersed in water are highly desirable. The light diffusing fiber 12 may also be useful for exit lighting, illuminating pathways, emitting IR radiation for room detectors, or used a thread in clothing, particularly protective/reflective clothing to further enhance visibility of the wearer. Examples of the use of the light diffusing fiber 12 in decorative illumination are manifold, but a few examples are use in appliance lighting and edge effects, automotive/aircraft illumination, or household and furniture illumination.

Figure 8B:
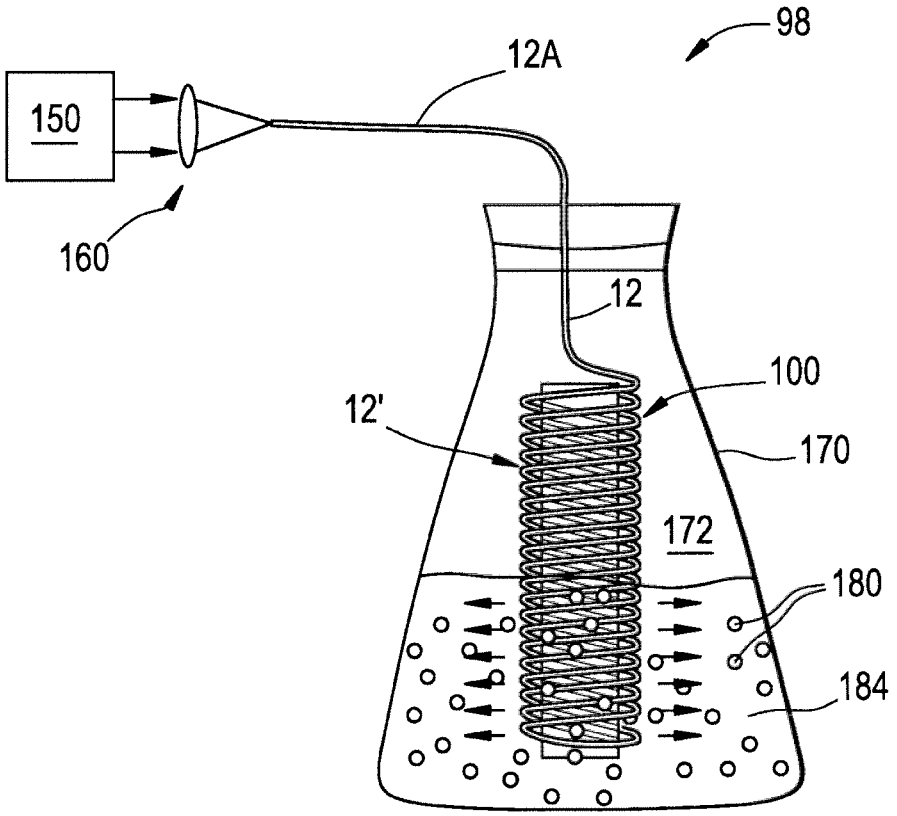
FIG. 8B illustrates an example embodiment of illumination system as used in combination with a biological chamber in the form of a flask.

FIG. 8B illustrates an example embodiment of a biological growth system 98 and an illumination system 100 as used in the biological growth system, wherein biological chamber 170 is in the form of a flask with an interior 172. The light source 150 and optical coupling system 160 are configured to couple light from the light source into the input ends of light conducting fiber. The output end of the low-scatter light conducting fiber 12A is coupled to the input end of the light diffusing fiber 12 (light source fiber). In the embodiment of FIG. 8B, the light-source fiber 12 is formed from a single counter-wound fiber. It is noted that the fiber 12 can wound around a support structure to form a light-source fiber portion where guided light is scattered from the fiber outer surface to form an extended light source that emits substantially uniform radiation. The bends in the light-source fiber portion are formed to enhance the amount of scattering in the light diffusing fiber 12. Counter-winding at least one fiber can increase the uniformity of the radiation by compensating for the effects of decreasing emitted radiation along the length of the light-source fiber portion. Multiple fibers 12 can be wound in sequence around a support structure, with each fiber coupled to the light source, can be used to form a lengthy extended source. The light diffusing fiber 12 can be configured to suit a variety of biological chamber geometries and provides light to the biological material growth of biological material 180. The biological material 180 may be, for example, algae (e.g., algae colonies, algae blooms) or bacteria (e.g., cyanobacteria). In an example embodiment, biological material 180 may be suspended in a support medium 184 such as water.

Coatings

In an example embodiment, fiber 12 may include a coating 44 as discussed above in connection with FIG. 2. In one exemplary embodiment, coating 44 includes a hydrophilic coating layer such as a UV-cured acrylate coating that provides improved wet adhesion. The coating layer may be UV curable coatings comprising a low modulus primary coating layer (typically <3 MPa) adjacent to the glass and a higher modulus secondary coating layer (typically >50 MPa). The higher modulus secondary coating layer is adjacent to, and situated over the primary (lower modulus) coating layer. Other, or additional coatings, applied either as a single layer coating or as a layer in a multi-layer coating may also be utilized. Examples of such materials are hydrophilic coating 44A (not shown) which serves as a cell growth medium or a coating containing a material to provide additional scattering to the escaped light. These coatings may also serve as a protective covering for the fiber 12.

Exemplary hydrophilic coatings 44A for use in coating 44 are those commonly used for improving cell adhesion and growth to surfaces and contain carboxylic acid functionality and amine functionality (e.g. formulations containing acrylic acid or acrylamides). In addition, hydrophilic coatings 44A may be enhanced by serving as a reservoir for nutrients essential for the growth of biological material.

In some exemplary embodiments, coating 44 includes fluorescent or ultraviolet absorbing molecules that serve to modify radiated light. Suitable up or down converter molecules may also be included in the coating to produce light of differing wavelengths from that of the input light source. Ink coating layers may also be applied to alter the color or hue of the emitted light. Other coating embodiments include molecules capable of providing additional scattering to the light emitted from the fiber. A further embodiment may be the inclusion of photo-active catalysts onto the coating that may be used to increase the rate of photo-reactions. One example of just such a catalyst is rutile $TiO_2$, as a photo-catalyst.

According to some embodiments, light diffusing fibers 12 may be enclosed within a polymeric, metal, or glass covering (or coatings), wherein said the coating or covering has a minimum outer dimension (e.g., diameter) greater than 250 μm. If the fiber(s) has a metal coating, the metal coating may contain open sections, to allow light to be preferentially directed into a given area. These additional coatings or coverings may also contain additional compounds to vary the emitted light or catalyze reactions in the same manner as described above for the coatings coated on the fiber.

As stated above, the light diffusing fiber 12 may comprise a hydrophilic coating disposed on the outer surface of the optical fiber. Also, fluorescent species (e.g., ultraviolet-absorbing material) may be disposed in the optical fiber coating, as well as molecules capable of providing additional scattering of the emitted light. According to some embodiments the light source coupled to the light diffusing fiber 12 generates light in 200 nm to 500 nm wavelength range and the fluorescent material (fluorescent species) in the fiber coating generates either white, green, red, or NIR (near infrared) light.

Furthermore, an additional coating layer may be provided on the fiber outer surface. This layer may be configured to modify the radiated light, alter the interaction of the coating materials. Examples of just such a coating would be coatings containing materials such as, but not limited to, poly (2-acrylamido-2-methanesulfonic acid), ortho-nitrobenzyl groups, or azobenzene monies respectively.

Exemplary Illumination System Configurations

Some exemplary embodiments of an illumination system include: (i) a light source that generates light having at least one wavelength 2, within the 200 nm to 2000 nm range; and (ii) at least one light diffusing optical fiber 12. The fiber 12 comprises having a core, cladding, and a plurality of nano-sized structures 32 situated within the core or at a core-cladding boundary. This optical fiber further includes an outer surface, and at least one end optically coupled to the light source. As described above, the light diffusing optical fiber 12 is configured to scatter guided light via the nano-sized structures such as voids away from the core and through the outer surface, to form a light-source fiber portion having a length that emits substantially uniform radiation over its length. The light diffusing optical fiber 12 has a scattering-induced attenuation greater than 50 dB/km for one or more wavelength(s) within the 200 nm to 2000 nm range (e.g. 400-700 nm, or 1 μm to 2 μm). The fiber 12 may have a plurality of bends formed therein so as to preferentially scatter light via the nano-sized structures 32 away from the core 20 and through the outer surface within specified area(s). Preferably, the deviation of the illumination intensity of scattered light is less than 30% of the maximum scattering illumination intensity along the length. According to some embodiments the scattering-induced attenuation is between 100 dB/km and 6000 dB/km, or higher. In some embodiments, attenuation due to scattering of fiber 12 is 6000 dB/km to 20000 dB/km for the one or more wavelength(s) situated within 200 nm to 2000 nm range. According to some embodiments fiber 12 has a length between 0.5 m and 100 m and the scattering-induced attenuation is between 300 dB/km and 5000 dB/km for the one or more wavelength(s) situated within 200 nm to 2000 nm range, and/or is greater than 3 dB/length of fiber. In other embodiments, the fiber 12 has a length between 0.1 m and 0.5 m and the scattering-induced attenuation is between 5000 dB/km and 20,000 dB/km for the one or more wavelength(s) situated within 200 nm to 2000 nm range. Preferably, the nano-sized structures 32 are gas filled voids (e.g., $SO_2$ filled voids) with diameter of greater than 10 nm, preferably greater than 50 nm, more preferably greater than 100 nm. Preferably the fiber cladding is either glass, or polymer, and is at least 20 μm thick. The cladding, in combination with said core, provides a NA of 0.2 or greater. As described above, uniformity of illumination along the fiber length (with about 30% from maximum intensity, and preferably within about 20% from maximum intensity, and more preferably within about 10% from maximum intensity) can be accomplished by controlling the fiber tension during the draw process. As previously discussed, the uniformity of the illumination can be further reduced by utilizing a reflector coupled to the end of the fiber that is opposite to the end of the fiber coupled to the optical source.

Thus, according to some embodiments, the light diffusing fiber 12 includes a core at least partially filled with nanostructures for scattering light, a cladding surrounding the core, and ay least one coating surrounding the cladding. For example, the core and cladding may be surrounded by a primary and secondary coating layers, and/or by an ink layer. In some embodiments the ink layer contains pigments to provide additional absorption and modify the spectrum of the light scattered by the fiber (e.g., to provide additional color(s) to the diffused light). In other embodiments, one or more of the coating layers comprises molecules which convert the wavelength of the light propagating through the fiber core such that the light emanating from the fiber coating (light diffused by the fiber) is at a different wavelength. In some embodiments the ink layer and/or the coating layer may comprise phosphor in order to convert the scattered light from the core into light of differing wavelength(s). In some embodiments the phosphor and/or pigments are dispersed in the primary coating. In some embodiments the pigments are dispersed in the secondary coating, in some embodiments the pigments are dispersed in the primary and secondary coatings. In some embodiments the phosphor and/or pigments are dispersed in the polymeric cladding. Preferably, the nanostructures are voids filled $SO_2$.

According to some embodiments the optical fiber 12 includes a primary coating, an optional secondary coating surrounding the primary coating and/or an ink layer (for example located directly on the cladding, or on one of the coatings. The primary and/or the secondary coating may comprise at leas one of: pigment, phosphors, fluorescent material, UV absorbing material, hydrophilic material, light modifying material, or a combination thereof The plurality of light diffusing fibers 12 can be bundled together in at least one of a ribbon, ribbon stack, or a round bundle. The fiber bundles or ribbons (i.e., collections of multiple fibers) can also be arranged in the shape of the light source in order to increase coupling efficiency. A typical bundle/ribbon structure can include, for example 2 to 36 light diffusing fibers 12, or, with overstocking of fibers, may include up to several hundreds of fibers 12.

As stated above, the optical fiber may comprise a hydrophilic coating disposed on the outer surface of the optical fiber. Alternatively, a hydrophilic coating may be disposed on the outer surface of the fiber ribbon. A ribbon may also be arranged in the shape of the light source, to provide better coupling between the light diffusing fibers 12 and the light source. An advantage derived from the ribbon structure is that winding of the individual fibers may not be necessary, because the ribbons may form bent structures such as waves, helices, or spirals thereby allowing light to scatter into desired areas. Furthermore, the use of multi-fiber ribbons affords the possibility of having large stacks of ribbons. Such ribbon stacks would provide a more concentrated amount of light, and also open the possibility to the use of different light sources, such as red lasers, sunlight, light emitting diodes, or guidance of point light sources. For example, according to one embodiment, a plurality of light diffusing optical fibers 12 may be optically coupled to either a single light source or a plurality of light sources, while the light diffusing optical fibers 12 are bundled together in at least one of a ribbon, ribbon stack, or a round bundle. Furthermore the bundles or ribbons of light diffusing fibers 12 may be connected to a light source(s) by a transmission fiber capable of directing the light towards the light diffusing fiber with a minimum of loss. This latter configuration can be expected to be very useful for remote lighting applications where light is gathered from a source distant from the area where light is to be delivered.

According to some embodiments, a light diffusing optical fiber includes:

1) a core, a cladding, and a plurality of nano-sized structures situated within said core or at a core-cladding boundary, the optical fiber further including an outer surface and is configured to (i) scatter guided light via said nano-sized structures away from the core and through the outer surface, (ii) have a scattering-induced attenuation greater than 50 dB/km at illumination wavelength; and 2) one or more coatings, such that either the cladding or at least one coating includes phosphor or pigments. According to some embodiments these pigments may be capable of altering the wavelength of the light such that the illumination (diffused light) provided by the outer surface of the fiber is of a different wavelength from that of the light propagating through fiber core. Preferably, the nanostructures are voids filled $SO_2$.

According to some embodiments, a light diffusing optical fiber includes: a core, a cladding, and a plurality of nano-sized structures situated within said core or at a core-cladding boundary. The optical fiber further includes an outer surface and is configured to (i) scatter guided light via said nano-sized structures away from the core and through the outer surface, (ii) have a scattering-induced attenuation greater than 50 dB/km at illumination wavelength; wherein the entire core includes nano-sized structures. Such fiber may optionally include at least one coating, such that either the cladding or at least one coating includes phosphor or pigments. According to some embodiments the nanostructures are voids filled $SO_2$.

According to some embodiments, a light diffusing optical fiber includes:

a core, and a plurality of nano-sized structures situated within said core such that the entire core includes nano-structures, the optical fiber further including an outer surface and is configured to (i) scatter guided light via said nano-sized structures away from the core and through the outer surface, (ii) have a scattering-induced attenuation greater than 50 dB/km at illumination wavelength, wherein the fiber does not include cladding. According to some embodiments the nanostructures are voids filled $SO_2$. The $SO_2$ filled voids in the nano-structured area greatly contribute to scattering (improve scattering).

According to some embodiments, a light diffusing optical fiber includes:

a core, and a plurality of nano-sized structures situated within said core such that the entire core includes nanostructures, said optical fiber further including an outer surface and is configured to (i) scatter guided light via said nano-sized structures away from the core and through the outer surface, (ii) have a scattering-induced attenuation greater than 50 dB/km at illumination wavelength wherein said fiber does not include cladding. According to some embodiments the fiber includes at least one coating such that either the cladding or the coating includes phosphor or pigments. According to some embodiments the nanostructures are voids filled $SO_2$. As stated above, the $SO_2$ filled voids in the nano-structured area greatly contribute to scattering (improve scattering).

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. A light diffusing optical fiber having an outer surface, said fiber comprising;

(i) a glass core, comprising (a) a region with a plurality of nano-sized structures within said core configured to scatter guided light via said nano-sized structures towards the outer surface, such that said light diffusing optical fiber has a scattering-induced attenuation greater than 50 dB/km at illumination wavelength; and (b) a solid glass region surrounding said region with a plurality of nano-sized structures having a higher refractive index delta than the region with a plurality of nano-sized structures; and (ii) a low index cladding surrounding said core, said cladding having a lower refractive index delta than said solid glass region.

2. The light diffusing optical fiber according to claim 1, wherein said low index cladding has a refractive index delta of less than −0.5% relative to silica.

3. The light diffusing optical fiber according to claim 1, wherein said low index cladding is glass.

4. The light diffusing optical fiber according to claim 1, wherein said low index cladding is a polymer.

5. The light diffusing optical fiber according to claim 4, wherein said low index cladding is: (i) silicone based; or (ii) a fluoroacrylate.

6. The light diffusing optical fiber according to claim 4, wherein said low index cladding is a fluorinated cladding.

7. The light diffusing optical fiber according to claim 1, further including phosphorus containing coating surrounding said cladding.

8. The light diffusing optical fiber of claim 1, said fiber core further having: (i) a core diameter greater than 50 μm and less than 500 μm; and/or (ii) numerical aperture NA, wherein NA>0.2.

9. The light diffusing optical fiber of claim 1, wherein said nano-sized structures are gas filled voids with diameter of greater than 10 nm.

10. A cable assembly of multiple fibers of claim 9 further comprising collections of multiple ribbons, or fibers gathered into a tube.

11. The light diffusing optical fiber of claim 1, said plurality of nano-sized structures is the nano-structured region that has a width of at least 7 μm; and wherein said cladding diameter is at least 125 μm.

12. The light diffusing optical fiber of claim 1, wherein said core has an outer diameter Rc, said core includes:

(i) a solid inner core section with an outer diameter $R_1$, such that $0.05Rc>R_1>0.9Rc$;

(ii) nano-structured region having a width $W_2$ wherein $0.05Rc>W_2>0.9Rc$; and (iii) outer solid core region having a width between $0.1Rc>Ws>0.9Rc$, wherein each section of said core comprises silica glass.

13. The light diffusing optical fiber of claim 12, said cladding comprises a low index polymer cladding surrounding core; and a polymer coating surrounding said cladding, said polymer coating.

14. The light diffusing optical fiber of claim 1, wherein said fiber is configured to be capable of guiding said light such that radiation out of said outer surface is substantially uniform, such that the difference between the minimum and maximum scattering illumination intensity is less than 30% of the maximum scattering illumination intensity.

15. The light diffusing optical fiber of claim 1, wherein said fiber having scattering-induced attenuation is 100 dB/km to 6000 dB/km at illumination wavelength.

16. The fiber bundles or ribbons comprising multiple light diffusing fibers according to claim 1.

17. The fiber bundles or ribbons of claim 16 containing 2-36 light diffusing fibers.

18. The light diffusing optical fiber comprising:

a core, a cladding, and a plurality of nano-sized structures situated within said core or at a core-cladding boundary, said optical fiber further including an outer surface and is configured to (i) scatter guided light via said nano-sized structures away from the core and through the outer surface, (ii) have a scattering-induced attenuation greater than 50 dB/km at illumination wavelength; and said fiber including at least one coating such that either said cladding or said at least one coating includes phosphor or pigments, wherein said nano-sized structures are situated within one region of said core, and said core further comprises a second region without the microstructures adjacent and surrounding the region that comprises nano-sized structures; said fiber further comprising a low index polymer cladding surrounding said second region; and said at least one coating is a polymer coating surrounding said cladding, said polymer coating having a higher refractive index than said a low index polymer cladding.

19. The light diffusing optical fiber of claim 18, wherein said coating includes phosphorus.

20. A light diffusing optical fiber having an outer surface, said fiber comprising:

(i) a glass core, comprising (a) a region with a plurality of nano-sized structures configured to scatter guided light via said nano-sized structures away from the core and towards the outer surface, such that said light diffusing optical fiber has a scattering-induced attenuation greater than 200 dB/km at illumination wavelength; and (b) a solid glass region surrounding said region with a plurality of nano-sized structures having a higher refractive index delta than the region with a plurality of nano-sized structures; and (ii) a low index cladding surrounding said core, said cladding having a lower refractive index delta than said solid glass region and is negative relative to silica;

(iii) a coating surrounding said cladding;

wherein said coating or cladding includes phosphorus.

21. The light diffusing optical fiber of claim 20, wherein the scattering loss is uniform in angular space.

22. The light diffusing optical fiber of claim 21, wherein said low index polymer cladding has a relative refractive index delta with respect to silica that is less than −0.5%.

23. The light diffusing optical fiber of claim 21, wherein said fiber provides illumination; and uniformity of illumination along the fiber length is with 30% from maximum intensity.

24. The light diffusing optical fiber of claim 21 wherein said nanostructures are voids filled with gas.

25. The light diffusing optical fiber of claim 20, wherein said fiber has a scattering-induced attenuation not less than 500 dB/km at the illumination wavelength.

26. The light diffusing optical fiber of claim 20, wherein said fiber has a scattering-induced attenuation greater than 1000 dB/km at illumination wavelength.

27. The light diffusing optical fiber of claim 20, wherein said fiber has a scattering-induced attenuation greater than 2000 dB/km at illumination wavelength.

28. The light diffusing optical fiber of claim 20, wherein said fiber core is silica or silica doped with Al, Ti, P, Ge, or a combination thereof.

29. The light diffusing optical fiber of claim 20, wherein said fiber core radius is less than 500 μm.

30. The light diffusing optical fiber of claim 20, wherein said fiber core has a core radius of 125-300 μm.

31. The light diffusing optical fiber of claim 20, wherein the fiber has a bend loss less than 3 dB/turn when fiber can be bent in an arc with a 5 mm radius.

32. The light diffusing optical fiber of claim 20 wherein said nanostructures are voids filled with $SO_2$.

*33. A light diffusing optical fiber comprising:*

*a glass core and a cladding surrounding the core, said light diffusing optical fiber having:*

*a scattering-induced attenuation over a length of the light diffusing optical fiber of greater than 50 dB/km for at least one wavelength between 200 nm and 2000 nm; and*

*a difference between a scattering light intensity for all scattering angles between 25 and 130 degrees and a maximum scattering light intensity less than or equal to 63% of the maximum scattering light intensity when light is provided to an end of said light diffusing optical fiber.*

*34. The light diffusing optical fiber of claim 33, wherein said light diffusing optical fiber has a difference between the scattering light intensity for all scattering angles between 30 and 110 degrees and the maximum scattering light intensity less than or equal to 52% of the maximum scattering light intensity.*

*35. The light diffusing optical fiber of claim 33, wherein said light diffusing optical fiber has a difference between the scattering light intensity for all scattering angles between 25 and 120 degrees and the maximum scattering light intensity less than or equal to 29% of the maximum scattering light intensity.*

*36. The light diffusing optical fiber of claim 33, wherein said light diffusing optical fiber has a difference between the scattering light intensity for all scattering angles between 30 and 130 degrees and the maximum scattering light intensity less than or equal to 34% of the maximum scattering light intensity.*

*37. The light diffusing optical fiber of claim 33, wherein said light diffusing optical fiber has a difference between a scattering light intensity for all scattering angles between 35 and 100 degrees and the maximum scattering light intensity less than or equal to 44% of the maximum scattering light intensity.*

*38. The light diffusing optical fiber of claim 33, wherein the light diffusing optical fiber has a radius greater than 45 μm and less than 265 μm.*

*39. The light diffusing optical fiber of claim 33, said fiber core further having: (1) a core diameter greater than 50 μm and less than 500 μm; and (ii) a numerical aperture greater than 0.2.*

*40. The light diffusing optical fiber of claim 33, wherein said cladding is a polymer.*

*41. The light diffusing optical fiber of claim 40, wherein said cladding is silicone based or a fluoroacrylate.*

*42. The light diffusing optical fiber of claim 33 further comprising:*

*a plurality of nano-sized structures located within the light diffusing optical fiber having an outer surface, wherein the light diffusing optical fiber is configured to scatter guided light, via said plurality of nano-sized structures, away from the core and through the outer surface to provide substantially uniform radiation out of said outer surface.*

*43. The light diffusing optical fiber of claim 42, wherein said nano-sized structures are gas filled voids.*

*44. The light diffusing optical fiber of claim 43, wherein said nano-sized structures have a diameter of greater than 10 nm.*

*45. A light diffusing optical fiber cable comprising:*

*a light diffusing optical fiber according to claim 33.*

*46. The light diffusing optical fiber cable of claim 45 further comprising:*

*a plurality of light diffusing optical fibers positioned in a tube, each of the plurality of light diffusing optical fibers comprising:*

*a glass core and a cladding surrounding the core, said plurality of light diffusing optical fibers each having:*

*a scattering-induced attenuation over a length of each of the light diffusing optical fibers of greater than 50 dB/km for at least one wavelength between 200 nm and 2000 nm; and*

*a difference between a scattering light intensity for all scattering angles between 25 and 130 degrees and a maximum scattering light intensity less than or equal to 63% of the maximum scattering light intensity when light is provided to an end of said light diffusing optical fiber.*

*47. The light diffusing optical fiber cable of claim 46, wherein the cable comprises one or more ribbons of said light diffusing optical fibers.*

*48. A light diffusing optical fiber cable comprising:*

*a light diffusing optical fiber according to claim 33, wherein the light diffusing optical fiber cable further comprises at least one of: (a) multiple light diffusing optical fibers, (b) ribbons, (c) collections of multiple ribbons, or (d) multiple fibers in a tube.*

*49. An illumination system, comprising:*

*a light source that generates light having at least one wavelength between 200 nm and 2000 nm; and*

*at least one light diffusing optical fiber comprising a glass core and a cladding surrounding the core, said light diffusing optical fiber having:*

*a scattering-induced attenuation over a length of the light diffusing optical fiber of greater than 50 dB/km for at least one wavelength between 200 nm and 2000 nm; and*

*a difference between a scattering light intensity for all scattering angles between 25 and 130 degrees and a maximum scattering light intensity less than or equal to 63% of the maximum scattering light intensity when the light is provided to said end of the light diffusing optical fiber.*

*50. The illumination system of claim 49, wherein said light diffusing optical fiber has a difference between the scattering light intensity for all scattering angles between 30 and 110 degrees and the maximum scattering light intensity less than or equal to 52% of the maximum scattering light intensity.*

51. The illumination system of claim 49, wherein said light diffusing optical fiber has a difference between the scattering light intensity for all scattering angles between 25 and 120 degrees and the maximum scattering light intensity less than or equal to 29% of the maximum scattering light intensity.

52. The illumination system of claim 49, wherein said light diffusing optical fiber has a difference between the scattering light intensity for all scattering angles between 30 and 130 degrees and the maximum scattering light intensity less than or equal to 34% of the maximum scattering light intensity.

53. The illumination system of claim 49, wherein said light diffusing optical fiber has a difference between a scattering light intensity in angular space for all scattering angles between 35 and 100 degrees and the maximum scattering light intensity less than or equal to 44% of the maximum scattering light intensity.

54. The illumination system of claim 49, wherein the light diffusing optical fiber has a radius greater than 45 μm and less than 265 μm.

55. The illumination system of claim 49, said fiber core further having: (1) a core diameter greater than 50 μm and less than 500 μm; and (ii) a numerical aperture greater than 0.2.

56. The illumination system of claim 49, wherein said nano-sized structured have a diameter of greater than 10 nm.

57. The illumination system of claim 49, wherein said cladding is a polymer.

58. The illumination system of claim 57, wherein said cladding is silicone based or a fluoroacrylate.

59. The illumination system of claim 49, wherein the at least one light diffusing optical fiber further comprises:

a plurality of nano-sized structures located within the light diffusing optical fiber having an outer surface, wherein the light diffusing optical fiber is configured to scatter guided light, via said plurality of nano-sized structures, away from the core and through the outer surface to provide substantially uniform radiation out of said outer surface.

60. The illumination system of claim 59, wherein said nano-sized structures are gas filled voids.

61. A light diffusing optical fiber comprising:

a glass core and a cladding surrounding the core, said light diffusing optical fiber having:

a scattering-induced attenuation over a length of the light diffusing optical fiber of greater than 50 dB/km for at least one wavelength between 200 nm and 2000 nm; and a ratio of a maximum scattering light intensity to a minimum scattering light intensity for an angular range of 30 degrees to 150 degrees of not greater than 3.63 times.

62. The light diffusing optical fiber of claim 61, wherein said light diffusing optical fiber has a ratio of a maximum scattering light intensity to a minimum scattering light intensity for an angular range of 30 degrees to 150 degrees of not greater than 2.15 times.

63. The light diffusing optical fiber of claim 61, said light diffusing optical fiber has a ratio of a maximum scattering light intensity to a minimum scattering light intensity for an angular range of 30 degrees to 150 degrees in a range from 2.15 to 3.63 times.

64. The light diffusing optical fiber of claim 61, wherein said light diffusing optical fiber has a ratio of a maximum scattering light intensity to a minimum scattering light intensity for an angular range of 60 degrees to 120 degrees of not greater than 2.31 times.

65. The light diffusing optical fiber of claim 61, wherein said light diffusing optical fiber has a ratio of a maximum scattering light intensity to a minimum scattering light intensity for an angular range of 60 degrees to 120 degrees of not greater than 1.37 times.

66. The light diffusing optical fiber of claim 61, wherein said light diffusing optical fiber has a ratio of a maximum scattering light intensity to a minimum scattering light intensity for an angular range of 60 degrees to 120 degrees in a range from 1.37 to 2.31 times.

67. The light diffusing optical fiber of claim 61, wherein said light diffusing optical fiber has a ratio of a maximum scattering light intensity to a minimum scattering light intensity for an angular range of 50 degrees to 130 degrees of not greater than 2.62 times.

68. The light diffusing optical fiber of claim 61, wherein said light diffusing optical fiber has a ratio of a maximum scattering light intensity to a minimum scattering light intensity for an angular range of 50 degrees to 130 degrees of not greater than 1.51 times.

69. The light diffusing optical fiber of claim 61, wherein said light diffusing optical fiber has a ratio of a maximum scattering light intensity to a minimum scattering light intensity for an angular range of 50 degrees to 130 degrees in a range from 1.51 to 2.62 times.

70. The light diffusing optical fiber of claim 61, wherein the light diffusing optical fiber has a radius greater than 45 μm and less than 265 μm.

71. The light diffusing optical fiber of claim 61, said fiber core further having: (1) a core diameter greater than 50 μm and less than 500 μm; and (ii) a numerical aperture greater than 0.2.

72. The light diffusing optical fiber of claim 61, wherein said cladding is a polymer.

73. The light diffusing optical fiber of claim 72, wherein said cladding is silicone based or a fluoroacrylate.

74. The light diffusing optical fiber of claim 61 further comprising:

a plurality of nano-sized structures located within the light diffusing optical fiber having an outer surface, wherein the light diffusing optical fiber is configured to scatter guided light, via said plurality of nano-sized structures, away from the core and through the outer surface to provide substantially uniform radiation out of said outer surface.

75. The light diffusing optical fiber of claim 74, wherein said nano-sized structures are gas filled voids.

76. The light diffusing optical fiber of claim 75, wherein said nano-sized structures have a diameter of greater than 10 nm.

77. A light diffusing optical fiber cable comprising:

a light diffusing optical fiber according to claim 61, wherein the light diffusing optical fiber cable further comprises at least one of: (a) multiple light diffusing optical fibers, (b) ribbons, (c) collections of multiple ribbons, or (d) multiple fibers in a tube.

78. An illumination system, comprising:

a light source that generates light having at least one wavelength between 200 nm and 2000 nm; and at least one light diffusing optical fiber comprising a glass core and a cladding surrounding the core, said light diffusing optical fiber having:

a scattering-induced attenuation over a length of the light diffusing optical fiber of greater than 50 dB/km for at least one wavelength between 200 nm and 2000 nm; and

*a ratio of a maximum scattering light intensity to a minimum scattering light intensity for an angular range of 30 degrees to 150 degrees of not greater than 3.63 times.*

*79. The illumination system of claim 78, wherein said light diffusing optical fiber has a ratio of a maximum scattering light intensity to a minimum scattering light intensity for an angular range of 30 degrees to 150 degrees of not greater than 2.15 times.*

*80. The illumination system of claim 78, said light diffusing optical fiber has a ratio of a maximum scattering light intensity to a minimum scattering light intensity for an angular range of 30 degrees to 150 degrees in a range from 2.15 to 3.63 times.*

*81. The illumination system of claim 78, wherein said light diffusing optical fiber has a ratio of a maximum scattering light intensity to a minimum scattering light intensity for an angular range of 60 degrees to 120 degrees of not greater than 2.31 times.*

*82. The illumination system of claim 78, wherein said light diffusing optical fiber has a ratio of a maximum scattering light intensity to a minimum scattering light intensity for an angular range of 60 degrees to 120 degrees of not greater than 1.37 times.*

*83. The illumination system of claim 78, wherein said light diffusing optical fiber has a ratio of a maximum scattering light intensity to a minimum scattering light intensity for an angular range of 60 degrees to 120 degrees in a range from 1.37 to 2.31 times.*

*84. The illumination system of claim 78, wherein said light diffusing optical fiber has a ratio of a maximum scattering light intensity to a minimum scattering light intensity for an angular range of 50 degrees to 130 degrees of not greater than 2.62 times.*

*85. The illumination system of claim 78, wherein said light diffusing optical fiber has a ratio of a maximum scattering light intensity to a minimum scattering light intensity for an angular range of 50 degrees to 130 degrees of not greater than 1.51 times.*

*86. The illumination system of claim 78, wherein said light diffusing optical fiber has a ratio of a maximum scattering light intensity to a minimum scattering light intensity for an angular range of 50 degrees to 130 degrees in a range from 1.51 to 2.62 times.*

*87. The illumination system of claim 78, wherein the light diffusing optical fiber has a radius greater than 45 μm and less than 265 μm.*

*88. The illumination system of claim 78, said fiber core further having: (1) a core diameter greater than 50 μm and less than 500 μm; and (ii) a numerical aperture greater than 0.2.*

*89. The illumination system of claim 78, wherein said cladding is a polymer.*

*90. The illumination system of claim 89, wherein said cladding is silicone based or a fluoroacrylate.*

*91. The illumination system of claim 78, wherein the at least one light diffusing optical fiber further comprises:*

*a plurality of nano-sized structures located within the light diffusing optical fiber having an outer surface, wherein the light diffusing optical fiber is configured to scatter guided light, via said plurality of nano-sized structures, away from the core and through the outer surface to provide substantially uniform radiation out of said outer surface.*

*92. The illumination system of claim 91, wherein said nano-sized structures are gas filled voids.*

*93. The illumination system of claim 92, wherein said nano-sized structured have a diameter of greater than 10 μm.*

*94. A light diffusing optical fiber comprising:*

*a core, a low index cladding surrounding the core, and a plurality of nano-sized structures located adjacent to a core-cladding boundary, wherein said core has at least one region without said nano-sized structures adjacent to said core-cladding boundary, said light diffusing optical fiber having:*

*(a) an outer surface, wherein the light diffusing optical fiber is configured to scatter guided light, via said plurality of nano-sized structures, away from the core and through the outer surface; and*

*(b) a scattering-induced attenuation over the length of greater than 50 dB/km at an illumination wavelength, said scattering-induced attenuation having a maximum intensity at a scattering angle greated than or equal to 43 degrees relative to a direction of propagation of light in the light diffusing optical fiber.*

*95. The light diffusing optical fiber of claim 94, wherein said low index cladding is a low index polymer.*

*96. The light diffusing optical fiber of claim 95, wherein said low index cladding is silicone based or a fluoroacrylate.*

*97. The light diffusing optical fiber of claim 94, wherein the core includes at least one dopant.*

*98. The light diffusing optical fiber of claim 97, wherein the at least one dopant comprises aluminum, titanium, phosphorus, germanium, or a combination thereof.*

*99. The light diffusing optical fiber of claim 94, wherein the at least one polymer coating includes a light scattering agent.*

*100. The light diffusing optical fiber of claim 94, wherein the low index cladding has a diameter of greater than 60 μm.*

*101. The light diffusing optical fiber of claim 94, wherein the low index cladding has a thickness of greater than 10 μm.*

*102. A light diffusing optical fiber cable comprising:*

*a light diffusing optical fiber according to claim 94, wherein the light diffusing optical fiber cable further comprises at least one of: (a) multiple light diffusing optical fibers, (b) ribbons, (c) collections of multiple ribbons, or (d) multiple fibers in a tube.*

*103. A light diffusing optical fiber comprising:*

*a glass core and a cladding surrounding the core, said light diffusing optical fiber having:*

*a scattering-induced attenuation over a length of the light diffusing optical fiber of greater than 50 dB/km for at least one wavelength between 200 nm and 2000 nm, said scattering-induced attenuation having a maximum intensity at a scattering angle greater than or equal to 43 degrees relative to a direction of propagation of light in the light diffusing optical fiber.*

*104. The light diffusing optical fiber of claim 103, wherein said scattering-induced attenuation has a maximum intensity at a scattering angle less than or equal to 65 degrees relative to the direction of propagation of light in the light diffusing optical fiber.*

*105. The light diffusing optical fiber of claim 103, wherein said light diffusing optical fiber has a radius greater than 45 μm and less than 265 μm.*

*106. The light diffusing optical fiber of claim 103, wherein said glass core has a core diameter greater than 50 μm and less than 500 μm.*

*107. The light diffusing optical fiber of claim 106, wherein said glass core has a core diameter greater than 125 μm and less than 300 μm.*

*108. The light diffusing optical fiber of claim 106, wherein said glass core has a numerical aperture greater than 0.2.*

*109. The light diffusing optical fiber of claim 103, wherein the cladding surrounding the core has a diameter greater than 60 μm.*

*110. The light diffusing optical fiber of claim 109, wherein the cladding surrounding the core has a diameter greater than 125 μm.*

*111. The light diffusing optical fiber of claim 103, wherein the cladding surrounding the core has a thickness greater than 10 μm.*

*112. The light diffusing optical fiber of claim 103, wherein the length of the light diffusing optical fiber is between 0.5 m and 100 m and said light diffusing optical fiber emits substantially uniform radiation over the length, wherein the substantially uniform radiation has less than 50% variation from a maximum intensity of radiation.*

*113. The light diffusing optical fiber of claim 103, wherein the length of the light diffusing optical fiber is between 0.5 m and 100 m and said light diffusing optical fiber emits substantially uniform radiation over the length, wherein scattering loss is within 30 percent of an average scattering loss over any segment of the length of 0.2 m.*

*114. A light diffusing optical fiber cable comprising:*

*a light diffusing optical fiber according to claim 103, wherein the light diffusing optical fiber cable further comprises at least one of: (a) multiple light diffusing optical fibers, (b) ribbons, (c) collections of multiple ribbons, or (d) multiple fibers in a tube.*

*115. The light diffusing optical fiber of claim 1, wherein the low index cladding has a diameter of greater than 60 μm.*

*116. The light diffusing optical fiber of claim 1, wherein the low index cladding has a thickness of greater than 10 μm.*

*117. The light diffusing optical fiber of claim 18, wherein the cladding has a diameter of greater than 60 μm.*

*118. The light diffusing optical fiber of claim 18, wherein the cladding has a thickness of greater than 10 μm.*

*119. The light diffusing optical fiber of claim 20, wherein the low index cladding has a diameter of greater than 60 μm.*

*120. The light diffusing optical fiber of claim 20, wherein the low index cladding has a thickness of greater than 10 μm.*

*121. A biological growth system, comprising:*

*an illumination system comprising at least one light diffusing optical fiber set forth in claim 1; and*

*a biological chamber comprising an interior configured to contain biological matter, wherein the illumination system provides light to the biological chamber.*

* * * * *